US010176659B2

(12) United States Patent
Yamaguchi et al.
(10) Patent No.: US 10,176,659 B2
(45) Date of Patent: Jan. 8, 2019

(54) PAPER SHEET AUTHENTICATION APPARATUS

(71) Applicant: GLORY LTD., Himeji-shi, Hyogo (JP)

(72) Inventors: Yoshiki Yamaguchi, Himeji (JP); Takeshi Sato, Himeji (JP)

(73) Assignee: GLORY LTD., Himeji-shi, Hyogo (JP)

(*) Notice: Subject to any disclaimer, the term of this patent is extended or adjusted under 35 U.S.C. 154(b) by 115 days.

(21) Appl. No.: 15/021,882

(22) PCT Filed: Sep. 30, 2013

(86) PCT No.: PCT/JP2013/076628

§ 371 (c)(1),
(2) Date: Mar. 14, 2016

(87) PCT Pub. No.: WO2015/045186

PCT Pub. Date: Apr. 2, 2015

(65) Prior Publication Data

US 2016/0225215 A1 Aug. 4, 2016

(51) Int. Cl.

*G01J 1/58* (2006.01)
*G07D 7/12* (2016.01)

(Continued)

(52) U.S. Cl.

CPC ............. *G07D 7/122* (2013.01); *G07D 7/005* (2017.05); *G07D 7/121* (2013.01); *G07D 7/1205* (2017.05)

(58) Field of Classification Search

CPC ........... G01N 21/6428; G01N 21/6458; G01N 21/6408; G01N 21/645; G01N 21/6452

See application file for complete search history.

(56) References Cited

U.S. PATENT DOCUMENTS

| | | | | |
|---|---|---|---|---|
| 2009/0141961 | A1 | 6/2009 | Smith et al. | |
| 2010/0073128 | A1* | 3/2010 | Talwerdi | G06K 9/00 340/5.8 |

(Continued)

FOREIGN PATENT DOCUMENTS

| | | | |
|---|---|---|---|
| EP | 1 647 946 | A1 | 4/2006 |
| JP | 2012-73897 | A | 4/2012 |

(Continued)

OTHER PUBLICATIONS

European Search Report (Application No. 13894480.6) (8 pages—dated Apr. 21, 2017).

(Continued)

*Primary Examiner* — David Porta
*Assistant Examiner* — Mamadou Faye
(74) *Attorney, Agent, or Firm* — Renner, Kenner, Greive, Bobak, Taylor & Weber

(57) ABSTRACT

A paper sheet authentication apparatus determines the type of the paper sheet by using a characteristic other than a fluorescent light characteristic, sequentially emits excitation lights of different wavelengths on the paper sheet, measures an intensity of light per wavelength within a predetermined range emitted by a fluorescent material applied to the paper sheet, and acquires fluorescent light characteristic data as the result. The paper sheet authentication apparatus performs the authentication of the paper sheet by using fluorescent light characteristic data of a genuine paper sheet previously stored per type of the paper sheet or a threshold calculated therefrom and the acquired fluorescent light characteristic data.

15 Claims, 17 Drawing Sheets

(51) Int. Cl.

| | |
|---|---|
| ***G07D 7/121*** | (2016.01) |
| ***G07D 7/005*** | (2016.01) |
| ***G07D 7/1205*** | (2016.01) |

(56) References Cited

U.S. PATENT DOCUMENTS

| | | | | |
|---|---|---|---|---|
| 2010/0252747 | A1 | 10/2010 | Nakano et al. | |
| 2012/0217416 | A1 | 8/2012 | Decoux | |
| 2014/0097359 | A1* | 4/2014 | Vasic | G01N 21/6408 250/459.1 |
| 2014/0294230 | A1* | 10/2014 | Nakano | G07D 7/20 382/100 |
| 2014/0312234 | A1* | 10/2014 | Tan | G01J 1/4228 250/349 |

FOREIGN PATENT DOCUMENTS

| | | | |
|---|---|---|---|
| WO | WO 2011/051399 | A1 | 5/2011 |
| WO | WO 2011/114455 | A1 | 9/2011 |

OTHER PUBLICATIONS

Chinese Office Action (Application No. 201380079598.1) (9 pages, dated Oct. 24, 2017).

* cited by examiner

PAPER SHEET AUTHENTICATION APPARATUS AND PAPER SHEET AS TARGET OF AUTHENTICATION

SCHEMATIC STRUCTURAL DIAGRAM OF FLUORESCENCE SENSOR

FLUORESCENT LIGHT CHARACTERISTIC DATA ACQUIRED BY FLUORESCENCE SENSOR

PLACEMENT DRAWING OF PHOTODIODES AND LIGHT EMITTING DIODES

CROSS-SECTION OF SENSOR UNIT

LED PLACEMENT DRAWING

PHOTODIODE PLACEMENT DRAWING

CROSS-SECTION OF PART OF SENSOR

PAPER SHEET AUTHENTICATION APPARATUS

TECHNICAL FIELD

The present invention relates to a paper sheet authentication apparatus that authenticates a paper sheet to which a fluorescent material is applied.

BACKGROUND ART

Conventionally, a technique of applying on a predetermined position on the paper sheet a fluorescent material having a predetermined fluorescent light characteristic, and performing authentication of the paper sheet by detecting an excited fluorescent light that is associated with the fluorescent light characteristic of the fluorescent material is known in the art. A wavelength of a light (referred to as excitation light) that causes a fluorescent material to emit a fluorescent light and a characteristic of a spectrum of a light emitted by the florescent material when irradiated with the excitation light are typically different per fluorescent material, and this is referred to as the fluorescent light characteristic.

For example, Patent Document 1 discloses a fluorescent material that emits an ultraviolet light when irradiated with an ultraviolet light, and a fluorescent material that emits an infrared light when irradiated with an infrared light. When performing the authentication of a valuable document at a predetermined position of which such a fluorescent material is applied, Patent Document 1 describes to emit the ultraviolet light or the infrared light on this document, which is the target of the authentication, and perform the authentication of the document by ensuring presence/absence of emission of a fluorescent light that is associated with the fluorescent material. When the technique disclosed in Patent Document 1 is used to perform the authentication of a paper sheet, it is possible to authenticate the paper sheet based on the presence/absence of the emission of the fluorescent light from the fluorescent material even though the emitted light cannot be detected with the human eyes. By detecting such differences on the emitted light that cannot be detected with the visible light, it is possible to precisely perform the authentication of a paper sheet.

However, some fluorescent materials have similar fluorescent light characteristics. Specifically, some fluorescent material have substantially the same wavelength of the excitation light and a peak wavelength of a fluorescence spectrum of light excited when irradiated with the excitation light; however, they have different characteristics other than the peak wavelength of the fluorescence spectrum. When paper sheets are applied with fluorescent materials that have substantially the same wavelength of the excited light and the same peak wavelength of the fluorescence spectrum excited when irradiated with the excitation light, but have different half-width of the fluorescence spectrum, such paper sheets cannot be distinguished by using the technology disclosed in Patent Document 1. However, a technique that can distinguish even such paper sheets is known in the art.

For example, Patent Document 2 discloses a technology that can distinguish paper sheets that are applied with fluorescent materials that have substantially the same wavelength of the excitation light and the peak wavelength of the fluorescence spectrum excited when irradiated with the excitation light, but have different half-width of the fluorescence spectrum. Concretely, the paper sheet is irradiated with an excitation light of a predetermined wavelength, an intensity of the light excited in the neighborhood of the peak wavelength of the fluorescence spectrum of the applied fluorescent material and an intensity of the light excited in the neighborhood of a wavelength that is shifted by a predetermined amount from the peak wavelength are measured, and which fluorescent material is applied to the paper sheet is determined based on the magnitude of the difference between the intensities of the received light of the two wavelengths.

CITATION LIST

Patent Document

Patent Document 1 EP Patent 1647946
Patent Document 2 WO 2011/114455

SUMMARY OF INVENTION

Technical Problem

However, it is required that an authentication apparatus can handle various types of paper sheets as targets of authentication to which fluorescent materials having different fluorescent light characteristics are applied respectively. This requires that a sensor can differentiate characteristics of fluorescence spectra emitted from fluorescent materials when the fluorescent materials are irradiated with excitation lights having different wavelengths.

It is known in the art that a fluorescence spectrophotometer can measure fluorescent light characteristics of various fluorescent materials. Such a fluorescence spectrophotometer emits excitation lights of all of the wavelengths in a predetermined wavelength range on a fluorescent material, and measures an intensity of light emitted by the fluorescent material per wavelength of the excitation light. The intensity is pertaining to a spectral information of the light emitted by the fluorescent material when irradiated with an excitation light of a particular wavelength. By using such a fluorescence spectrophotometer, it is possible to acquire the fluorescent light characteristic data of various fluorescent materials, and by using the acquired fluorescent light characteristic data, it is possible to perform the authentication of the paper sheets to which a fluorescent material is applied. However, fluorescence spectrophotometers are very costly; moreover, they are not suitable to perform authentication of a paper sheet on a partial region on which printing is performed by using an ink that contains a fluorescent material.

The present invention has been made to solve to the above-explained issues in the conventional techniques, and it is an object thereof to provide a paper sheet authentication apparatus with a simple structure that can speedily perform authentication of different types of paper sheets to which fluorescent materials having different characteristics of fluorescent light are applied.

Means For Solving Problems

To solve the above problems and to achieve the above object, according to an aspect of the present invention, a paper sheet authentication apparatus that determines authentication of a paper sheet to which a fluorescent material is applied includes a type determination unit that determines a type of the paper sheet; an excitation-light light source that selects one excitation light from a plurality of excitation lights having different wavelengths and emits the selected excitation light on the paper sheet; a plurality of types of filters, each type of the filter passing a light of only a wavelength band of a different predetermined range among the lights emitted by the fluorescent material applied to the paper sheet; a plurality of light receivers, each light receiver arranged corresponding to one type of the filter and receives the light passed by the filter; a fluorescent light characteristic data generating unit that generates fluorescent light characteristic data based on an intensity of light of a wavelength band of the predetermined range received by the light receivers when the excitation light of the wavelength selected by the excitation-light light source is emitted; a storage unit that previously stores therein fluorescent light characteristic data of a genuine paper sheet corresponding to the type of the paper sheet or a decision criterion value calculated from the fluorescent light characteristic data of the genuine paper sheet; and an authentication unit that authenticates the paper sheet by using the fluorescent light characteristic data or the decision criterion value stored in the storage unit of the genuine paper sheet corresponding to the type of the paper sheet determined by the type determination unit and the fluorescent light characteristic data generated by the fluorescent light characteristic data generating unit.

In the above paper sheet authentication apparatus, the excitation-light light source, the filters, and the light receivers are all arranged on one surface side of the paper sheet.

In the above paper sheet authentication apparatus, the excitation-light light source is arranged on one surface side of the paper sheet, and the filters and the light receivers are arranged on other surface side of the paper sheet.

In the above paper sheet authentication apparatus, while the excitation-light light source selects one excitation light from among the excitation lights of the different wavelengths and emits the selected excitation light on the paper sheet, each of the light receivers receives an intensity of the light that has passed the corresponding filter at the same time or sequentially.

In the above paper sheet authentication apparatus, the excitation-light light source periodically and sequentially emits excitation lights of different wavelengths, the light receivers periodically and sequentially receive a light of one wavelength band at one time, and the fluorescent light characteristic data generating unit generates the fluorescent light characteristic data respectively based on an intensity of light of the wavelength band received by each of the light receivers.

In the above paper sheet authentication apparatus, the fluorescent light characteristic data generating unit generates a matrix of an excitation wavelength and a light receiving wavelength band from a plurality of excitation light wavelength ranges, each excitation light wavelength range including wavelengths of a plurality of excitation lights and a light receiving wavelength band respectively passed by each of the filters, the excitation-light light source sequentially emits a plurality of excitation lights of different wavelengths on the paper sheet, the light receivers respectively receives a light that has passed through a corresponding one of the filters, the fluorescent light characteristic data generating unit generates the fluorescent light characteristic data based on an intensity of light in each domain of the matrix, the storage unit stores therein domains of a matrix to be used in the authentication per type of the paper sheet, and the authentication unit performs the authentication by using the fluorescent light characteristic data of the domain of the matrix identified per type of the paper sheet stored in the storage unit based on the result obtained by the type determination unit.

In the above paper sheet authentication apparatus, the authentication unit determines that a light of a corresponding wavelength band is received when an intensity of light received by the light receiver is a specified value or more, and determines that a light of a corresponding wavelength band is not received when an intensity of light received by the light receiver is less than the specified value.

The above paper sheet authentication apparatus further includes an optical image acquisition unit that acquires an optical image of the paper sheet, and the type determination unit determines at least the type of the paper sheet by using image data of a predetermined area of the paper sheet acquired by the optical image acquisition unit while transporting the paper sheet.

In the above paper sheet authentication apparatus, the light receivers measure an intensity of light emitted by the transported paper sheet, and the fluorescent light characteristic data generating unit generates the fluorescent light characteristic data based on the intensities of lights measured by the light receivers at the position of the paper sheet.

In the above paper sheet authentication apparatus, the light receivers receive intensities of lights while the excitation light is emitted by the excitation-light light source and receive intensities of lights after the excitation-light light source is turned off as an intensity of phosphorescent light, the fluorescent light characteristic data generating unit further generates phosphorescent light characteristic data based on the intensity of phosphorescent light, the storage unit previously stores therein phosphorescent light characteristic data of a genuine paper sheet corresponding to the type of the paper sheet or a decision criterion value calculated from the phosphorescent light characteristic data of the genuine paper sheet, and the authentication unit determines, based on the type of the paper sheet determined by the type determination unit, authenticity of the paper sheet by using the phosphorescent light characteristic data relating to phosphorescent light of the genuine paper sheet stored in the storage unit or both of the phosphorescent light characteristic data and the fluorescent light characteristic data and the phosphorescent light characteristic data stored in the storage unit or both of the phosphorescent light characteristic data and the fluorescent light characteristic data.

In the above paper sheet authentication apparatus, the excitation-light light source emits excitation lights having different wavelengths in a visible light band, and the filters pass lights having different wavelengths in an infrared light band.

In the above paper sheet authentication apparatus, the excitation-light light source emits excitation lights having different wavelengths in an infrared light band, and the filters pass lights having different wavelengths in an infrared light band.

Advantageous Effects of Invention

According to the present invention, a type of the paper sheet is determined; a plurality of excitation lights having different wavelengths emit sequentially on the paper sheet; the light emitted by the fluorescent material applied to the paper sheet is filtered to pass a light of a wavelength band of a plurality of different predetermined ranges; the light filtered per plurality of different predetermined ranges is received and an intensity thereof is measured; fluorescent light characteristic data is generated based on a wavelength of the excitation light and the measured intensity of light of a wavelength of the predetermined range passed by the filtering; and the paper sheet is authenticated by using fluorescent light characteristic data of a genuine paper sheet corresponding to the type of the paper sheet, or a threshold value obtained from the fluorescent light characteristic data. Accordingly, the authentication of several types of the paper sheets to which fluorescent materials having different fluorescent light characteristics are applied can be performed speedily and easily.

DESCRIPTION OF EMBODIMENTS

Preferred embodiments of a paper sheet authentication apparatus according to the present invention are explained below in detail while referring to the accompanying drawings.

First Embodiment

Figure 1A:
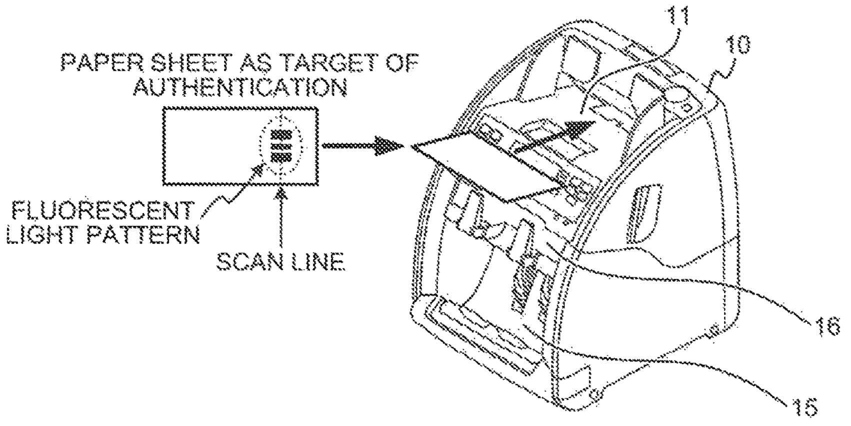
FIGS. 1A to 1C are schematic explanatory drawings for explaining a general outline of a paper sheet authentication apparatus according to a first embodiment of the present invention.
Figure 1B:
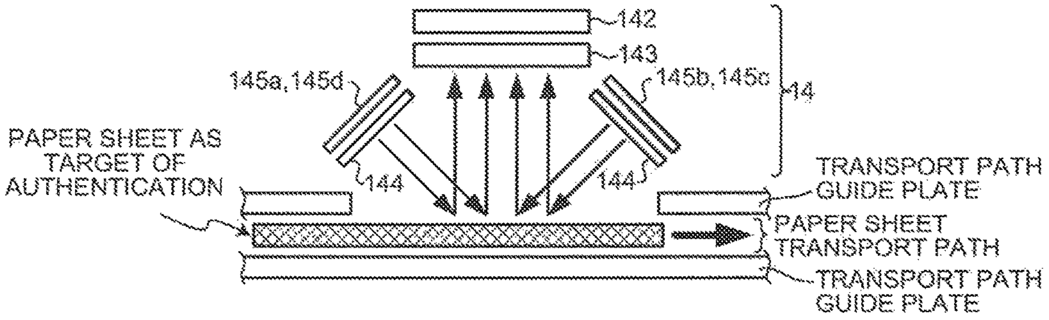
Figure 1C:
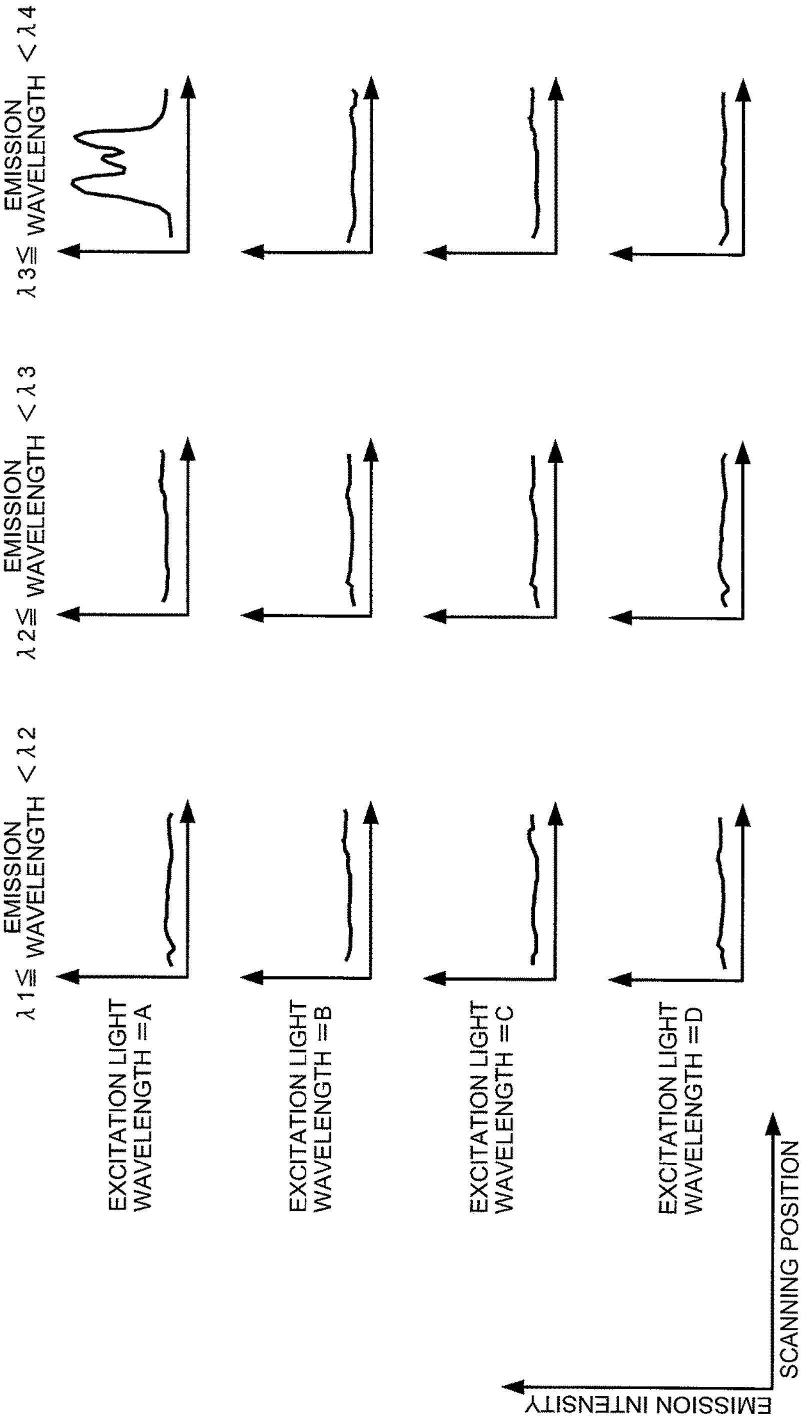

A general outline of a paper sheet authentication apparatus 10 according to a first embodiment of the present invention is explained below by using FIGS. 1A to 1C. FIG. 1A depicts an example of an outer configuration of the paper sheet authentication apparatus 10 as well as an example of a paper sheet that is the target of authentication. FIG. 1B is a schematic structural diagram of a fluorescence sensor 14 included in the paper sheet authentication apparatus 10 for acquiring a fluorescent light characteristic of the paper sheet. FIG. 1C depicts examples of fluorescent light characteristic data acquired by the fluorescence sensor 14 shown in FIG. 1B.

As shown in FIG. 1A, printing is performed at a predetermined position on the paper sheet, which is the target of the authentication, by using a special ink that contains a fluorescent material. In the first embodiment, the authentication of the paper sheet is performed by detecting the fluorescent light characteristic of the fluorescent material. The paper sheet authentication apparatus 10 includes, arranged on a front side of the device, a hopper 11 on which a plurality of paper sheets, which are the targets of the authentication, can be stacked; a stacking unit 15 to which paper sheets, which were set on the hopper 11 and recognized as genuine paper sheets, are transported; and a reject unit 16 that to which paper sheets, which were set on the hopper 11 and recognized as non-genuine paper sheets are transported. The paper sheet authentication apparatus 10 acquires fluorescence sensor acquired data from each of a plurality of positions on a scan line shown in FIG. 1A of the paper sheet set on the hopper 11 by using the fluorescence sensor 14 shown in FIG. 1B, and authenticates the paper sheet based on the fluorescent light characteristic data generated from the fluorescence sensor acquired data.

FIG. 1B is a schematic structural diagram of the fluorescence sensor 14 included in the paper sheet authentication apparatus 10 to measure the fluorescent light characteristic of the paper sheet that is fed from the hopper 11. The fluorescence sensor 14 emits excitation lights from first to fourth light sources 145*a*, 145*b*, 145*c*, 145*d* on the paper sheet being transported to a paper sheet transport path guided between transport path guide plates, and measures an intensity of light emitted from the paper sheet by receiving the light with a receiving unit 142. In the first embodiment, the excitation lights emitted by the first to fourth light sources 145*a*, 145*b*, 145*c*, 145*d* are visible lights, and the light emitted by the fluorescent material of the paper sheet is an infrared light.

The first to fourth light sources 145*a*, 145*b*, 145*c*, 145*d* are four types of light emitting diodes that respectively emit a visible light of a different wavelength. The fluorescence sensor 14 turns on the four light emitting diodes, i.e., the first to fourth light sources 145*a*, 145*b*, 145*c*, 145*d*, one by one, and the receiving unit 142 detects a response of the fluorescent material of the paper sheet to the excitation lights of the different wavelengths. In the first embodiment, it is assumed that the first to fourth light sources 145*a*, 145*b*, 145*c*, 145*d* emit excitation lights having wavelengths A, B, C, D, respectively. The receiving unit 142 receives the infrared light emitted by the fluorescent material and acquires an intensity of the infrared light.

A light-source side filter 144 is arranged between the first to fourth light sources 145*a*, 145*b*, 145*c*, 145*d* and the paper sheet. The light-source side filter 144 filters out the infrared light component present in the excitation light emitted by the first to fourth light sources 145*a*, 145*b*, 145*c*, 145*d*. Thus, because the infrared light component of the excitation light does not reach the receiving unit 142, the receiving unit 142 can receive only the infrared light emitted by the fluorescent material. The receiving unit 142 includes a four-divided photodiode in which four photodiodes are arranged in the form of a two-by-two matrix on a single substrate. That is, the receiving unit 142 includes four independent receiving units. A receiving side filter 143 is arranged between the receiving unit 142 and the paper sheet. The receiving side filter 143 includes a band pass filter that passes an infrared light in a wavelength range that differs for each of the four receiving units. Thus, the four receiving units of the receiving unit 142 can receive a light per band that has been filtered by the receiving side filter 143. Accordingly, it is possible to detect an intensity of light per band of the infrared component of the fluorescent light emitted from the paper sheet. In the first embodiment, as an example, a case is explained in which three of the four-divided photodiodes of the receiving unit 142 are used for the detection of the fluorescent light characteristic. Moreover, it is assumed that the three receiving units can detect an intensity of received light in a wavelength range of λ1 or longer and shorter than λ2, an intensity of received light in a wavelength range of λ2 or longer and shorter than λ3, and an intensity of received light in a wavelength range of λ3 or longer and shorter than λ4.

FIG. 1C depicts examples of the fluorescent light characteristic data acquired by the fluorescence sensor 14 shown in FIG. 1B on the scan line shown in FIG. 1A of the paper sheet that is the target of the authentication. The fluorescent material contained in the ink used to print a fluorescent light pattern on the paper sheet, which is the target of the authentication, shown in FIG. 1A, exhibits the fluorescent light characteristic in which it emits the light having the wavelength in a range of λ3 or longer and shorter than λ4 when irradiated with the excitation light of the wavelength A. In the various graphs shown in FIG. 1C, a vertical axis represents an intensity of received light by the receiving unit 142 and a horizontal axis represents a distance from the rightmost edge on the scan line on the paper sheet that is the target of the authentication. Because the fluorescent material contained in the ink used to print the fluorescent light pattern on the paper sheet emits the light having the wavelength in the range of λ3 or longer and shorter than λ4 when irradiated with the excitation light of the wavelength A, the effect of light emission by the fluorescent material contained in the fluorescent light pattern appears in the upper right graph in FIG. 1C. Moreover, three peaks in the upper right graph in FIG. 1C reflect the influence of the position and form of the fluorescent light pattern shown in FIG. 1A.

The paper sheet authentication apparatus 10 previously stores therein the fluorescent light characteristic data shown in FIG. 1C corresponding to a genuine paper sheet, acquires the fluorescent light characteristic data shown in FIG. 1C corresponding to the paper sheet that is the target of the authentication, and performs the authentication of the target paper sheet of the authentication by evaluating a similarity between the two data. A fluorescent material, which when irradiated with excitation lights having the wavelengths A, B, C, or D, has the fluorescent light characteristic whereby it emits a light excited by the irradiation with the excitation light having the wavelength A and it emits the florescent light having the wavelength in the range of λ1 or longer and shorter than λ4, is applied to the paper sheet that is the target of the authentication and shown in FIG. 1C. Moreover, the paper sheet authentication apparatus 10 previously stores therein the fluorescent light characteristic data shown in FIG. 1C of a genuine paper sheet for each type of the paper sheets. The paper sheet authentication apparatus 10 recognizes the type and the orientation of the paper sheet being transported based on an image of the paper sheet obtained by irradiating the paper sheet with a visible light or an infrared light. Then, the paper sheet authentication apparatus 10 compares the fluorescent light characteristic data of the genuine paper sheet corresponding to the recognized type and the orientation of the paper sheet and the fluorescent light characteristic data acquired from the paper sheet that is the target of the authentication, and evaluates a similarity between them to authenticate. This allows the authentication of various types of the paper sheets to be performed. When comparing the fluorescent light characteristic data, one approach is to evaluate the similarity between the fluorescent light characteristic data of the genuine paper sheet and the fluorescent light characteristic data acquired from the paper sheet by using a correlation coefficient. Another approach may be to set a threshold value based on an accumulated value obtained by integrating data in a predetermined integration section and may determine that a predetermined fluorescent light exists if a corresponding value is more than the threshold value.

Thus, the type of the paper sheet is determined by using a characteristic other than the fluorescent light characteristic, the paper sheet is irradiated sequentially with the excitation lights of different wavelengths, and the fluorescent light characteristic data, which is obtained as the result of measurement of the intensity of light in a predetermined wavelength range emitted by the fluorescent material of the paper sheet, is compared with the fluorescent light characteristic data of the genuine paper sheet previously stored corresponding to each type and transport (scan) direction of the paper sheet. The authentication of the paper sheet is performed by evaluating the similarity between the two data. With this method, the authentication of the several types of the paper sheets to which fluorescent materials having different fluorescent light characteristics are applied can be performed easily.

Figure 2A:
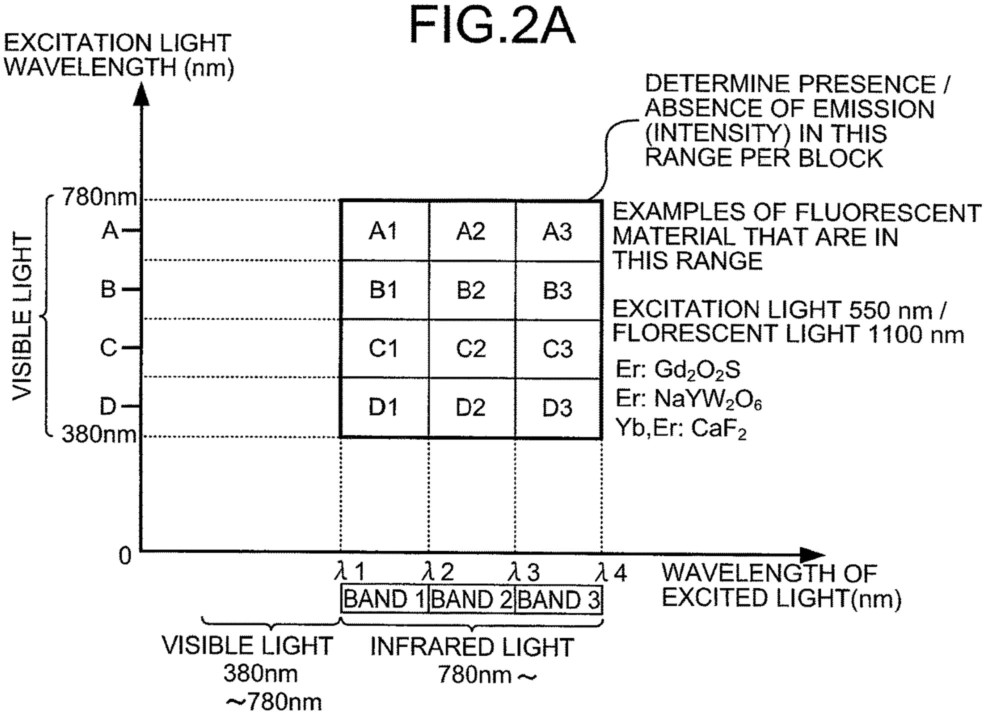
FIGS. 2A and 2B are explanatory drawings for explaining a fluorescent light characteristic of a fluorescent material applied to a paper sheet in the first embodiment.
Figure 2B:
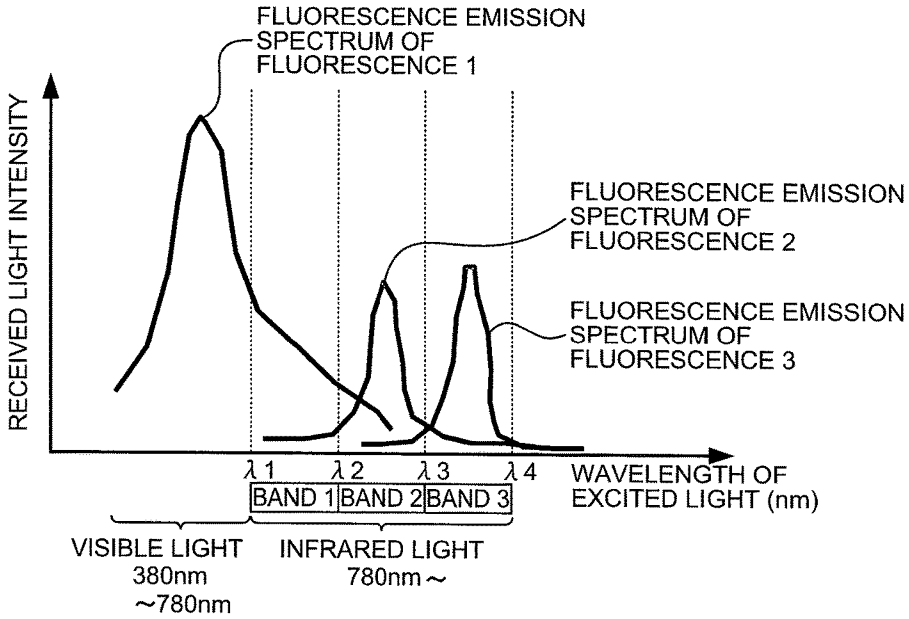

Subsequently, the fluorescent light characteristic of the fluorescent material applied to the paper sheet in the first embodiment is explained by using FIGS. 2A and 2B. FIG. 2A is a view for explaining a block used to identify the fluorescent material applied to the paper sheet that is the target of the authentication in the first embodiment. FIG. 2B is a view for explaining a characteristic of a typical emission spectrum of a fluorescent material that emits a light in a region of the near-infrared light.

Each type of the fluorescent material emits a specific fluorescent light when irradiated with an excitation light of a predetermined wavelength, and the emitted fluorescent light has a specific spectrum that is specific to the type of the fluorescent material. In the first embodiment, a visible light having a wavelength in the range of 380 nm and 780 nm is used as the excitation light, and the paper sheet, to which a fluorescent material that emits an infrared light having a wavelength of 780 nm or longer is applied, is the target of the authentication. Some of the fluorescent materials including rare earths are known to have the fluorescent light characteristic whereby they emit a strong light in a specific wavelength range.

Specifically,

Er: $Gd_2O_2S$

Er: $NaYW_2O_6$

Yb, Er: $CaF_2$ and the like, can be used.

These materials are known to emit a fluorescent light having a wavelength of approximately 1100 nm when irradiated with an excitation light having a wavelength of approximately 550 nm.

FIG. 2A is a view that defines the blocks that represent a relationship between the wavelength of the excitation light, and the wavelength of the light that is emitted by the fluorescent material and received by the receiving unit 142 of the fluorescence sensor. In the first embodiment, the wavelength region of the excitation light from 380 nm to 780 nm is divided into four regions, and four types of the excitation lights each having a peak of a spectrum in the respective region can emit on the paper sheet. The four peak wavelengths of the spectrums of the excitation lights are denoted by A, B, C, D. Moreover, in the first embodiment, the receiving unit 142, which receives the fluorescent light excited by the irradiation with the respective excitation lights, can detect an intensity of light corresponding to each of the following three bands: band 1 for which the wavelength is in the range of λ1 or longer and shorter than λ2, band 2 for which the wavelength is in the range of λ2 or longer and shorter than λ3, and band 3 for which the wavelength is in the range of λ3 or longer and shorter than λ4.

In the first embodiment, as shown in FIG. 2A, 12 blocks of the wavelength ranges are set: A1 to A3, B1 to B3, C1 to C3, and D1 to D3. The block A1 is a block of the band 1 in which the peak wavelength of the spectrum of the excitation light is A, and the wavelength range of the fluorescent light is in the range of λ1 or longer and shorter than λ2. The block A2 is a block of the band 2 in which the peak wavelength of the spectrum of the excitation light is A, and the wavelength range of the fluorescent light is in the range of λ2 or longer and shorter than λ3. The block A3 is a block of the band 3 in which the peak wavelength of the spectrum of the excitation light is A, and the wavelength range of the fluorescent light is in the range of λ3 or longer and shorter than λ4. Similarly, B1 to B3 are blocks in which the peak wavelength of the spectrum of the excitation light is B, C1 to C3 are blocks in which the peak wavelength of the spectrum of the excitation light is C, and D1 to D3 are blocks in which the peak wavelength of the spectrum of the excitation light is D.

Depending on the type of the fluorescent material, the fluorescent material emits a fluorescent light having a wavelength that falls in one of the blocks A1 to A3, B1 to B3, C1 to C3, and D1 to D3. The authentication of the paper sheet in the first embodiment is performed by using this fact. When the paper sheet is applied with a predetermined fluorescent material at a predetermined position thereof, whether the paper sheet is a genuine paper sheet or not is determined by detecting presence/absence of the emission of the fluorescent light from the predetermined position on the paper sheet, and deciding whether the wavelength of the detected fluorescent light is within the above blocks corresponding to the emission of the fluorescent light from the fluorescent material of the genuine paper sheet.

FIG. 2B shows an example of a representative fluorescence emission spectrum of a fluorescent material that contains rare earths and emits a fluorescent light in the wavelength range of a near-infrared light. Moreover, FIG. 2B shows fluorescence spectra of fluorescent materials 1, 2, 3 having different fluorescent light characteristics.

Many of the fluorescent materials that emit a fluorescent light having a peak wavelength in the infrared light range have a sharp peak spectrum as exemplified by the spectrum waveforms of the fluorescent materials 2 and 3. In the case of the fluorescent material 2, the peak wavelength of the florescent light emitted therefrom is detected in the band 2, and, in the case of the fluorescent material 3, the peak wavelength of the florescent light emitted therefrom is detected in the band 3.

Moreover, many of the fluorescent materials, as exemplified by the fluorescent material 1, whose peak wavelength is detected in the band 1 that is near the visible light range, have a fluorescence spectrum whose peak wavelength falls in the visible light range. However, in the case of the fluorescent materials that have a peak wavelength of the fluorescence spectrum in the visible light range, as exemplified by the fluorescence spectrum of the fluorescent material 1, an intensity of light at the peak wavelength is strong and the spreading of the spectrum is also wide. This allows detection of the fluorescent light of such fluorescent materials even in the range of the band 1. In the paper sheet that is applied with the fluorescent material having the characteristic represented by the fluorescence spectrum of the fluorescent material 1, the fluorescent light can be detected in the band 1, which is the infrared light range, although the peak wavelength of the fluorescence spectrum thereof is in the visible light range.

Figure 3A:
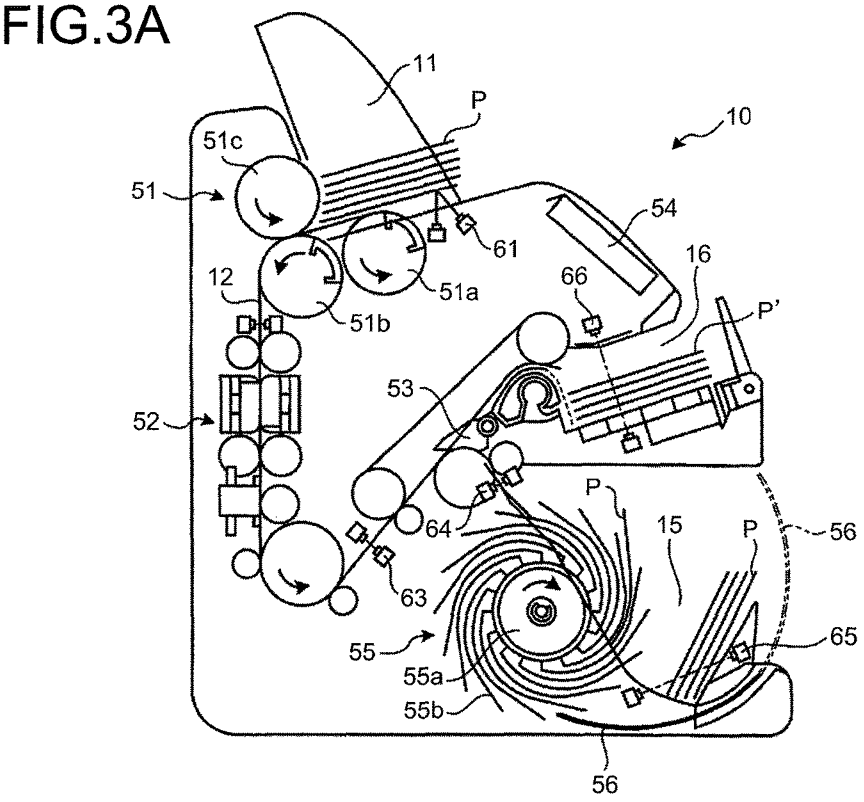
FIGS. 3A and 3B are physical structural drawings for explaining an internal structure of the paper sheet authentication apparatus shown in FIGS. 1A to 10.
Figure 3B:
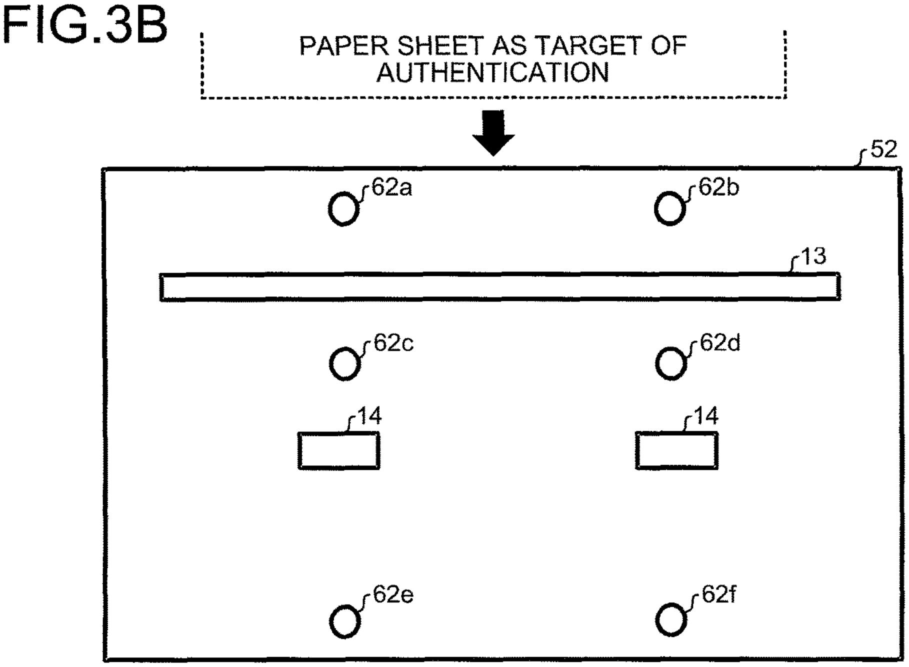

A physical internal structure of the paper sheet authentication apparatus 10 shown in FIG. 1A is explained below by using FIGS. 3A and 3B. FIG. 3A is a cross-sectional view of the paper sheet authentication apparatus 10, and FIG. 3B is a view indicating a placement of sensors and the like included in a recognition and counting unit 52 that performs recognition, authentication, counting, and the like of the paper sheets transported by a transport unit 12 of the paper sheet authentication apparatus 10.

At first, a physical internal structure of the paper sheet authentication apparatus 10 is explained while referring to FIG. 3A. As shown in FIG. 3A, the paper sheet authentication apparatus 10 includes the hopper 11 in which a plurality of paper sheets P to be recognized and counted are placed in a stacked manner, a feeding unit 51 that feeds out inside a housing the paper sheet P one by one from the bottom of the stack of the paper sheets P placed on the hopper 11, and the transport unit 12 that transports the paper sheet P one by one fed out by the feeding unit 51 inside the housing.

The recognition and counting unit 52 includes the fluorescence sensors 14 and other sensors according to the present embodiment and they are installed along the transport unit 12. The recognition and counting unit 52 functions as a recognition unit that performs, by using the fluorescence sensors 14 and the other sensors, the recognition, authentication, and counting of the paper sheets P fed out from the hopper 11 inside the housing. The configuration of the recognition and counting unit 52 will be explained later by using FIG. 3B.

The feeding unit 51 includes a kicker roller 51*a* that abuts on a surface of the paper sheet P at the bottom of the stack of the paper sheets P placed on the hopper 11, and a feeding roller 51*b* arranged downstream of the kicker roller 51*a* in feeding-out direction of the paper sheet P and performs feeding out of the paper sheets P, which are sent inside the housing by the kicker roller 51*a*. A gate roller (reverse roller)

51*c* is arranged opposing the feeding roller 51*b* thereby forming a gate part between the feeding roller 51*b* and the gate roller 51*c*.

The paper sheet P sent in by the kicker roller 51*a* passes through the gate part and is fed out one by one to the transport unit 12 inside the housing. The paper sheet fed out to the transport unit 12 is transported to the recognition and counting unit 52. The recognition and counting unit 52 acquires image data and fluorescent light data from the paper sheet being transported. As shown in FIG. 3A, the transport unit 12 forks into two transport paths at a point downstream of the recognition and counting unit 52. One of the transport paths is connected to the stacking unit 15 and the other of the transport paths is connected to the reject unit 16. After the authentication of the paper sheet based on the image data, the fluorescent light data, and the like acquired from the paper sheet by the recognition and counting unit 52, the paper sheet determined to be a genuine paper sheet is transported to the stacking unit 15, and the paper sheet determined to be a non-genuine paper sheet is transported to the reject unit 16.

An opening is provided on a front side (a right surface in FIG. 3A) of the stacking unit 15. An operator can take out the paper sheets P accumulated in the stacking unit 15 from this opening. An opening is also provided on a front side of the reject unit 16. The operator can take out paper sheets P' accumulated in the reject unit 16 from this opening.

As shown in FIG. 3A, a diverting unit 53 is arranged at the point at which the two transport paths of the transport unit 12 diverge. The diverting unit 53 includes a diverting member and a driver (not shown) that drives the diverting member. The diverting unit 53 selectively sends the paper sheet P that is received from upstream of the diverting unit 53 to one of the transport paths among the two diverging transport paths.

The stacking unit 15 is provided with a stacking-wheel type stacking mechanism 55 at a position in the back part of the housing (left of the stacking unit 15 shown in FIG. 3A). This stacking-wheel type stacking mechanism 55 includes a stacking wheel 55*a* and a driving unit (not shown) that drives the stacking wheel 55*a*. The stacking wheel 55*a* rotates in a clockwise direction (direction shown by an arrow in FIG. 3A) in FIG. 3A about an axis that extends horizontally but orthogonally to the surface of the paper sheet on which FIG. 3A is printed. The stacking wheel 55*a* is provided with a plurality of blades 55*b* on an outer periphery thereof that extend outward but in the opposite direction (counterclockwise direction in FIG. 3A) with respect to the direction of rotation of the stacking wheel 55*a*. These blades 55*b*, as shown in FIG. 3A, are arranged at regular intervals on the outer periphery of the stacking wheel 55*a*.

The stacking wheel 55*a* of the stacking-wheel type stacking mechanism 55 is always rotated by the driver in the clockwise direction in FIG. 3A while the paper sheet authentication apparatus 10 is operating. The paper sheets P are sent one by one to the stacking wheel 55*a* from the transport unit 12. The stacking wheel 55*a* receives the paper sheet P sent from the transport unit 12 between two blades 55*b* thereof, and sends the paper sheet P that has been received between the blades 55*b* to the stacking unit 15. In this way, the paper sheets P are sent one by one from the stacking wheel 55*a* to the stacking unit 15, and a plurality of the paper sheets P are accumulated in the stacking unit 15.

The paper sheet authentication apparatus 10 is provided with a shutter 56 to close the opening located in the front of the stacking unit 15. This opening located in the front of the stacking unit 15 can be opened/closed by appropriately operating the shutter 56. The shutter 56 is moved by a shutter driving unit (not shown) for driving the shutter 56 between an opened position, at which the shutter 56 is drawn back from the opening located in the front of the stacking unit 15 to open the opening, and a closed position, at which the shutter 56 closes the opening located in the front of the stacking unit 15. That is, when the shutter 56 is at the opened position, the shutter 56 is in a drawn back state from the opening located in the front of the stacking unit 15 and the opening is opened, and, the operator can access the paper sheets P accumulated in the stacking unit 15.

On the other hand, when the shutter 56 is at the closed position, the opening located in the front of the stacking unit 15 is closed by the shutter 56, and, the operator cannot access the paper sheets P accumulated in the stacking unit 15. In FIG. 3A, the shutter 56 at the opened position is shown with a continuous line and the shutter 56 at the closed position is shown with an alternate long and two short dashes line.

As shown in FIG. 3A, the paper sheet authentication apparatus 10 includes various sensors. Specifically, the hopper 11 is provided with a hopper remaining paper-sheet detecting sensor 61 including a reflective-type optical sensor to detect whether the paper sheet P has remained in the hopper 11. Moreover, a diversion timing sensor 63 including an optical sensor is arranged upstream of the diverting unit 53 in the transport unit 12. The diverting member of the diverting unit 53 is moved to either of a position for sending the paper sheet P to the stacking unit 15 and a position for sending the paper sheet P to the reject unit 16 at a timing at which the paper sheet P is detected by the diversion timing sensor 63.

A paper-sheet passage detecting sensor 64 including an optical sensor is arranged in the transport path that connects to the stacking unit 15, downstream of the point at which the diverting unit 53 is arranged where the transport path diverges into two transport paths, to detect the paper sheet P sent to this transport path. This paper-sheet passage detecting sensor 64 detects whether the paper sheet P is diverted at the diverting unit 53 to the transport path that connects to the stacking unit 15.

The stacking unit 15 is provided with a stacking-unit paper-sheet detecting sensor 65 including an optical sensor to detect whether the paper sheet P is accumulated in the stacking unit 15. The reject unit 16 is provided with a reject-unit paper-sheet detecting sensor 66 including an optical sensor to detect whether the paper sheet P' is accumulated in the reject unit 16.

Moreover, as shown in FIG. 3A, a display and operation unit 54 is arranged on the front side of the housing of the paper sheet authentication apparatus 10. The display and operation unit 54 is an input/output unit that displays information and accepts input of information from the operator. Specifically, information such as the number of sheets or the total amount per denomination of paper sheets P counted by the recognition and counting unit 52 is displayed on the display and operation unit 54. Moreover, the display and operation unit 54 accepts instructions relating to the operation from the operator.

FIG. 3B shows a configuration of the recognition and counting unit 52 shown in FIG. 3A. The recognition and counting unit 52 is provided with paper-sheet passage detecting sensors 62*a* and 62*b*, a line sensor 13, paper-sheet passage detecting sensors 62*c* and 62*d*, the fluorescence sensors 14, and paper-sheet passage detecting sensors 62*e* and 62*f* arranged in this order in a transport direction of the paper sheet. These sensors detect passing of the paper sheet.

A scanning operation by the line sensor 13 is started when a leading edge of the paper sheet is detected by the paper-sheet passage detecting sensors 62*a* and 62*b*, and the scanning operation by the line sensor 13 is stopped when a trailing edge of the paper sheet is detected by the paper-sheet passage detecting sensors 62*c* and 62*d*. A scanning operation by the fluorescence sensors 14 is started when the leading edge of the paper sheet is detected by the paper-sheet passage detecting sensors 62*c* and 62*d*, and the scanning operation by the fluorescence sensors 14 is stopped when the trailing edge of the paper sheet is detected by the paper-sheet passage detecting sensors 62*e* and 62*f*.

The line sensor 13 acquires an image of the area covering the entire width of the paper sheet. The fluorescence sensors 14 are arranged at such positions where they can perform scanning along a predetermined scan line on the paper sheet. Two fluorescence sensors 14 are arranged in the example shown in FIG. 3B and they acquire the fluorescent light characteristics with respect to the two scan lines on the paper sheet. It is needless to mention that, a large number of fluorescence sensors 14 may be arranged into an array form.

Figures 4A, 4B:
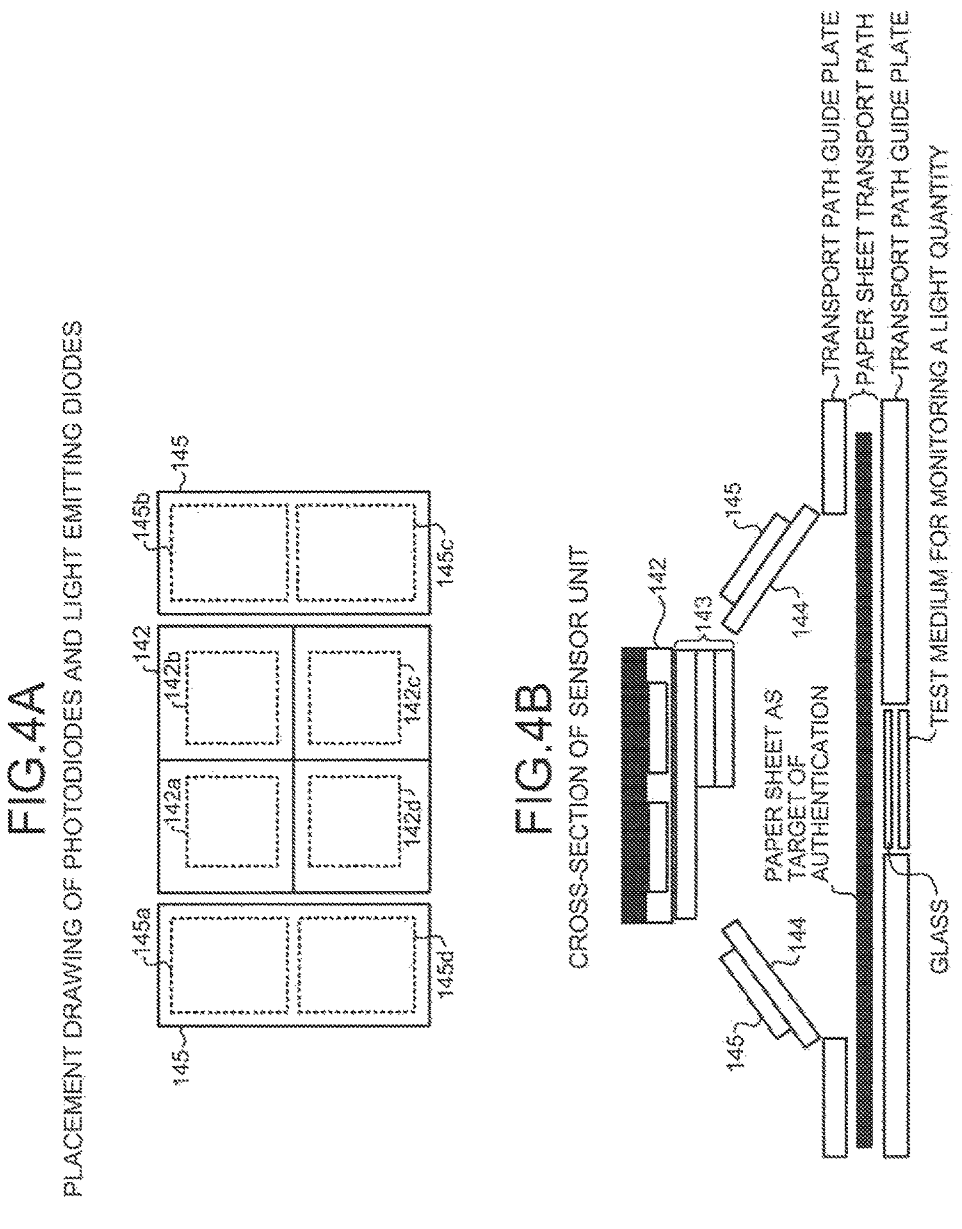
FIGS. 4A and 4B are internal structural drawings for explaining an internal structure of a reflective-type fluorescence sensor shown in FIGS. 3A and 3B.

An internal structure of the reflective-type fluorescence sensor 14 that is shown in FIGS. 3A and 3B is explained by using FIGS. 4A and 4B. FIG. 4A is a view of structures of a light source 145, which is a light source of an excitation light emitted by the fluorescence sensor 14, and the receiving unit 142, which detects a fluorescent light emitted from the paper sheet, when seen from the paper sheet transport path. FIG. 4B is a cross-sectional view of the reflective-type fluorescence sensor 14 when cut along a vertical plane that is parallel to the transport direction of the paper sheet.

At first, the structures of the light source 145 and the receiving unit 142 are explained by referring to FIG. 4A. The light source 145 is a light emitting diode that emits excitation lights of four different wavelengths. The light source 145 includes the first light source 145*a* that emits an excitation light of the wavelength A, the second light source 145*b* that emits an excitation light of the wavelength B, the third light source 145*c* that emits an excitation light of the wavelength C, and the fourth light source 145*d* that emits an excitation light of the wavelength D.

The receiving unit 142 is a four-divided photodiode and those four photodiodes can independently measure an intensity of received light. As shown in FIG. 4B, the receiving side filter 143 is arranged to filter out the light received by each of the four photodiodes so that each of the photodiodes receives a light of only a specific wavelength range. In this manner, with the four photodiodes, it is possible to measure the intensity of lights of four different wavelength ranges. The receiving unit 142 includes a first receiving unit 142*a* that measures an intensity of light of the band 1 having the wavelength range of λ1 or longer and shorter than λ2, a second receiving unit 142*b* that measures an intensity of light of the band 2 having the wavelength range of A2 or longer and shorter than λ3, a third receiving unit 142*c* that measures an intensity of light of the band 3 having the wavelength range of λ3 or longer and shorter than λ4, and a fourth receiving unit 142*d* that measures the intensity of the received light without performing wavelength filtering.

A structure of the reflective-type fluorescence sensor 14 is explained below by using the cross-sectional view of the reflective-type fluorescence sensor 14 shown in FIG. 4B. As shown in FIG. 4B, the fluorescence sensor 14 is installed above of the paper sheet transport path, which is formed between an upper transport path guide plate and a lower transport path guide plate, and the light source 145 and the receiving unit 142 are arranged on the same side with respect to the paper sheet transport path. When the excitation light is emitted from the light source 145, the excitation light passes through the light-source side filter 144 and illuminates the paper sheet that is the target of the authentication. A light reflected from the paper sheet and the fluorescent light emitted by the fluorescent material applied to the paper sheet are filtered by the receiving side filter 143, and the intensity of light received per band is detected by the receiving unit 142. The light-source side filter 144 is an infrared light cutting filter that prevents infrared light component of the light emitted by the light source 145 from being received by the receiving unit 142 by filtering out the infrared light component of the light emitted by the light source. Thus, the receiving unit 142 can detect only infrared light contained in the fluorescent light.

As shown in FIG. 4B, a test medium for monitoring a light quantity is arranged, below a glass window, in a transport path guide plate that is arranged right below the fluorescence sensor 14. When no paper sheet is being processed, automatic maintenance is performed by using this test medium. When performing the automatic maintenance, the light source 145 is turned on in a state in which no paper sheet is present on the transport path and emits light on the test medium which is arranged below the transport path, and a reflected light is received in the fourth receiving unit 142*d* having no receiving side filter 143. The intensity of light received by the fourth receiving unit 142*d* is measured after turning on the light emitting diodes of the four light sources one by one. When comparing the measured intensity with the intensity of light measured in a state in which everything is normal, if the measured intensity is lower than a predetermined threshold intensity, it is determined that there is a failure. Moreover, even if the measured intensity of light is higher than the failure determination threshold intensity for each of the four light sources, but if it is different from a proper intensity which was obtained in a normal state, the intensity of the excitation light may be adjusted by adjusting a current supplied to the light emitting diodes.

A configuration of the receiving side filter 143, of the fluorescence sensor 14, which is shown in FIGS. 4A and 4B, is explained below using FIGS. 5A and 5B.

Figure 5A:
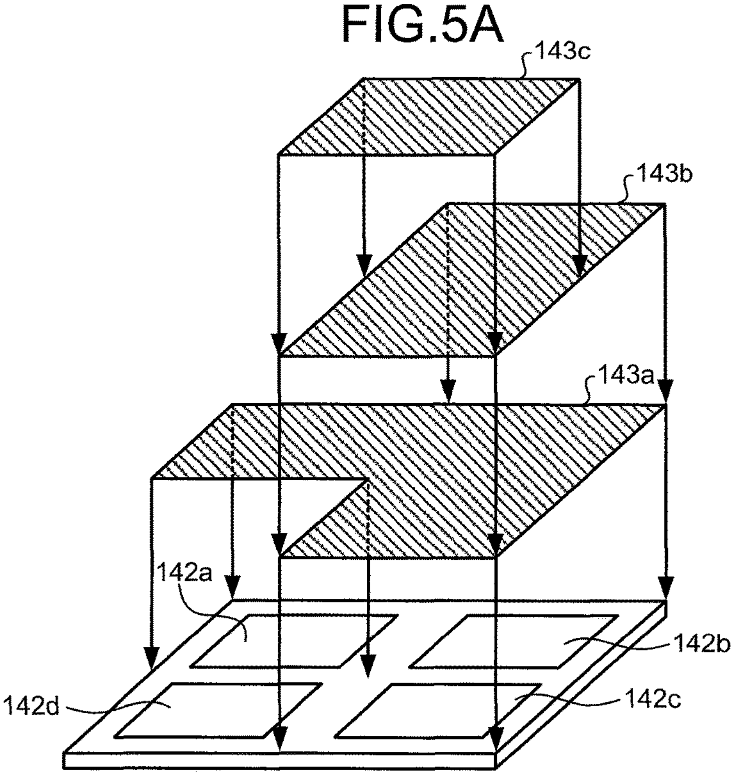
FIGS. 5A and 5B are explanatory drawings for explaining a configuration of a receiving side filter of the fluorescence sensor shown in FIGS. 4A and 4B.

As shown in FIG. 5A, the receiving unit 142 includes four receiving units of the first receiving unit 142*a*, the second receiving unit 142*b*, the third receiving unit 142*c*, and the fourth receiving unit 142*d*. The receiving side filter 143 including three filters of a first receiving side filter 143*a*, a second receiving side filter 143*b* and a third receiving side filter 143*c* is overlapped on the receiving unit 142. As shown in FIG. 5A, the first receiving side filter 143*a* is overlapped on the first receiving unit 142*a*, the second receiving unit 142*b*, and the third receiving unit 142*c*, the second receiving filter 143*b* is overlapped on the second receiving unit 142*b* and the third receiving unit 142*c*, and the third receiving side filter 143*c* is overlapped on the third receiving unit 142*c*. The fourth receiving unit 142*d* can receive the lights of all the wavelengths, including a visible light, as it is not overlapped by any filter.

Figure 5B:
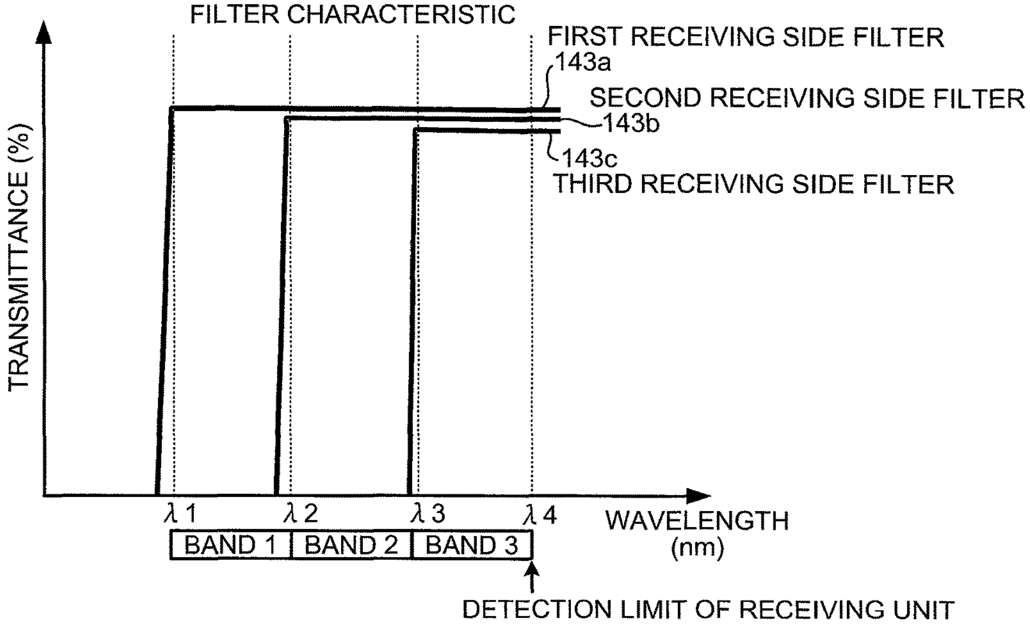

As shown in FIG. 5B, the first receiving side filter 143*a* passes the light having the wavelength λ1 or longer, the second receiving side filter 143*b* passes the light having the wavelength λ2 or longer, and the third receiving side filter 143*c* passes the light having the wavelength λ3 or longer. The material of the photodiode of the receiving unit 142 used in the first embodiment is silicon. Because the wavelength detection limit of the silicon photodiode is approximately 1100 nm, λ4 is taken to be 1100 nm. When the intensity of light received in the first receiving unit 142*a* is taken as Va, the intensity of light received in the second receiving unit 142*b* is taken as Vb, the intensity of light received in the third receiving unit 142*c* is taken as Vc, the intensity of light having the wavelength of the band 1 can be calculated as (Va−Vb), the intensity of light having the wavelength of the band 2 can be calculated as (Vb−Vc), and the intensity of light having the wavelength of the band 3 will be Vc.

A lighting timing of the light source 145 of the fluorescence sensor 14 shown in FIGS. 4A and 4B, and a measurement timing of the intensity of light received by the receiving unit 142 shown in FIGS. 4A and 4B are explained below by using FIG. 6.

As for the light source, the first light source 145*a* that emits the light having the wavelength A is turned on at a time point t1 and turned off at a time point t4, the second light source 145*b* that emits the light having the wavelength B is turned on at a time point t5 and turned off at a time point t8, the third light source 145*c* that emits the light having the wavelength C is turned on at a time point t9 and turned off at a time point t12, and the fourth light source 145*d* that emits the light having the wavelength D is turned on at a time point t13 and turned off at a time point t16. By the receiving unit 142, at the timing when the respective light sources emit the light, the intensity of light received by the first receiving unit 142*a*, the second receiving unit 142*b*, and the third receiving unit 142*c*, respectively, are acquired.

Specifically, by the first receiving unit 142*a*, the second receiving unit 142*b*, and the third receiving unit 142*c*, the intensity of light is acquired between time points t2 and t3 that are between the time points t1 and t4 while the first light source 145*a* is emitting the light. By the first receiving unit 142*a*, the second receiving unit 142*b*, and the third receiving unit 142*c*, the intensity of light is acquired between time points t6 and t7 that are between the time points t5 and t8 while the second light source 145*b* is emitting the light. By the first receiving unit 142*a*, the second receiving unit 142*b*, and the third receiving unit 142*c*, the intensity of light is acquired between time points t10 and t11 that are between the time points t9 and t12 while the third light source 145*c* is emitting the light. By the first receiving unit 142*a*, the second receiving unit 142*b*, and the third receiving unit 142*c*, the intensity of light is acquired between time points t14 and t15 that are between the time points t13 and t16 while the fourth light source 145*d* is emitting the light.

Figure 6:
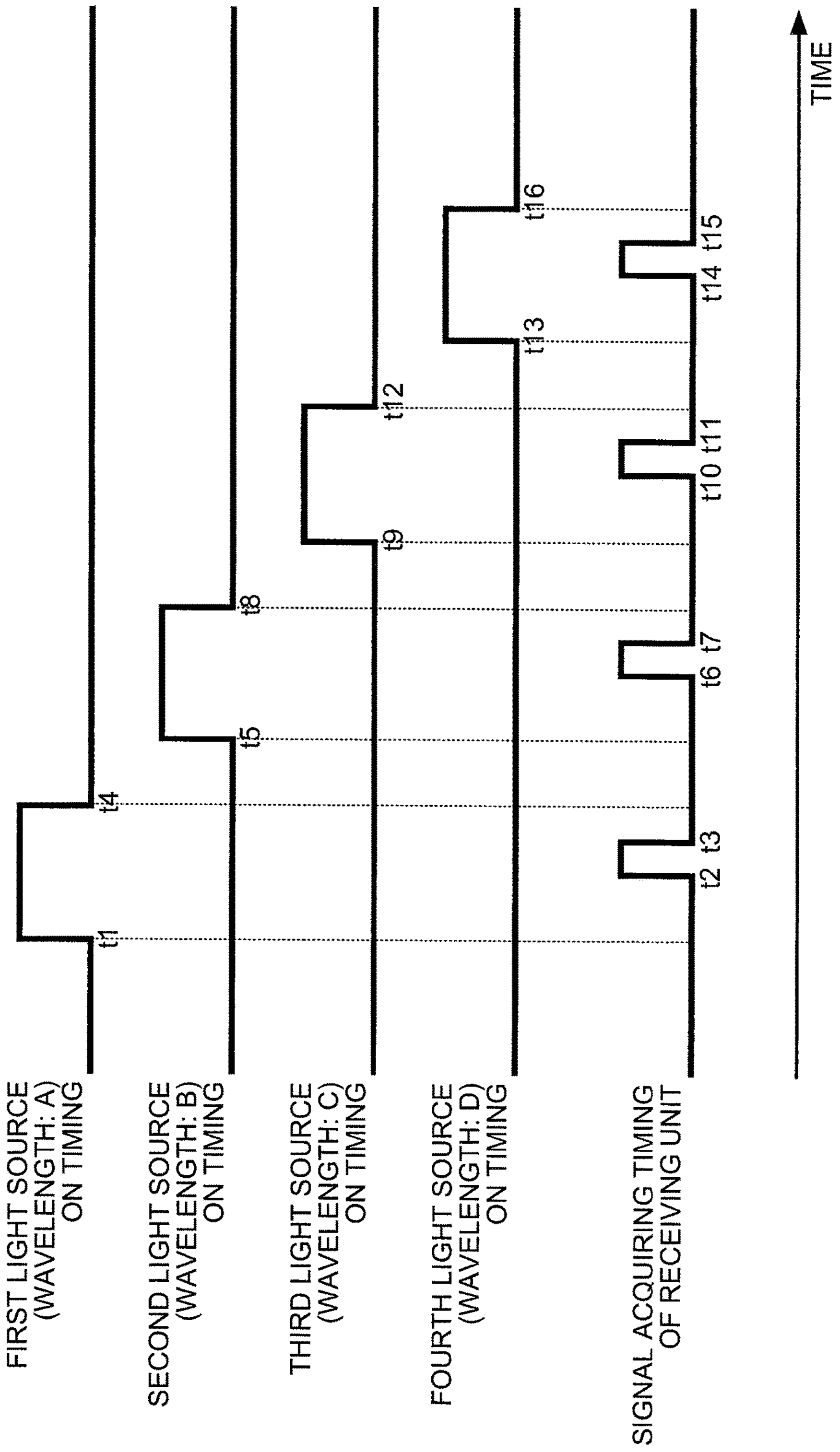
FIG. 6 is a view for explaining a lighting timing of light sources of the fluorescence sensor and a measurement timing of an intensity of a light received by a receiving unit shown in FIGS. 4A and 4B.

When performing scanning on the scan line, shown in FIG. 1A, on the paper sheet that is the target of the authentication, a series of processing shown in FIG. 6 involving the light emission by the four light sources and the light intensity acquisition by the receiving unit 142 is performed at one point on the scan line, and by repeating the same series of processing each time the paper sheet has been transported for a predetermined distance, the fluorescent light characteristic data shown in FIG. 1C can be acquired.

The first receiving unit 142*a*, the second receiving unit 142*b*, and the third receiving unit 142*c* may be configured to receive the light sequentially one after the other while the excitation light having the wavelength A is emitted by the light source 145, as shown in FIG. 6. Alternatively, by arranging light receiving circuits in parallel, the first receiving unit 142*a*, the second receiving unit 142*b*, and the third receiving unit 142*c* may be configured to receive the light at one time. Although not shown in the drawings, at the post stage of the receiving unit 142, an amplifier circuit and an A/D converter for performing analogue to digital conversion are arranged.

An internal functional configuration of the paper sheet authentication apparatus 10 according to the first embodiment shown in FIGS. 1A to 1C is explained below by using FIG. 7.

Figure 7:
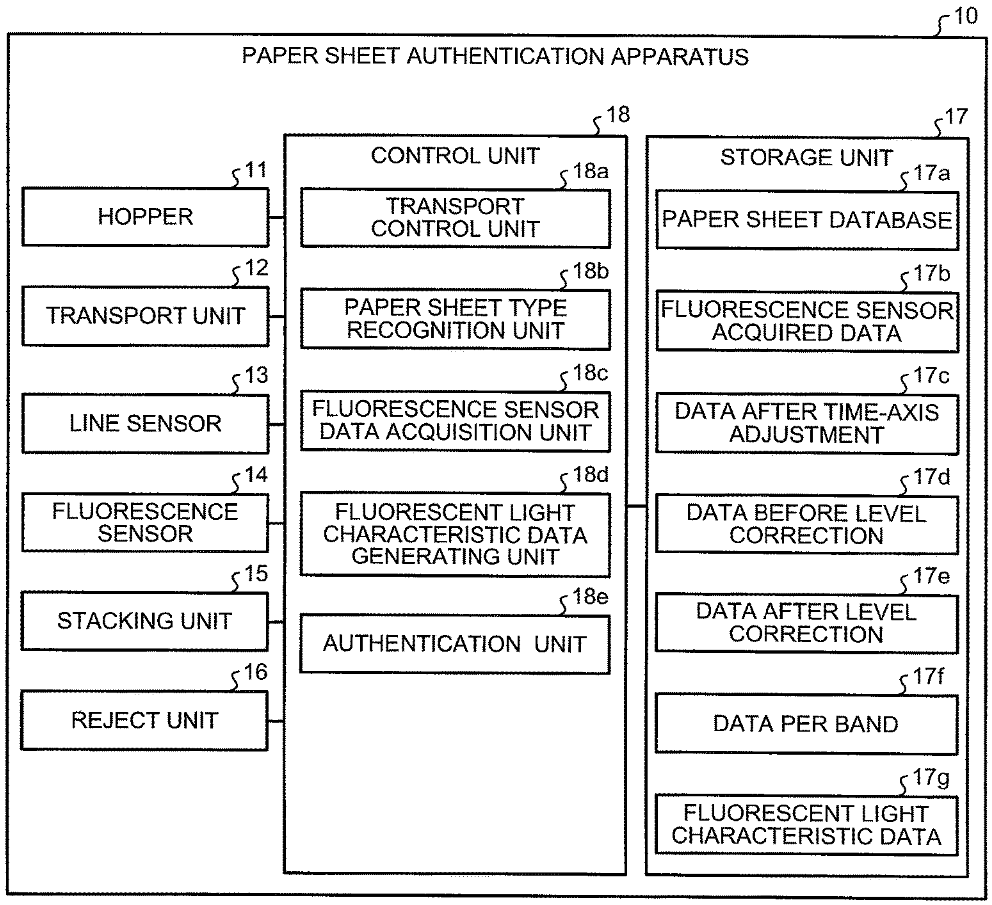
FIG. 7 is a functional block diagram for explaining an internal functional configuration of the paper sheet authentication apparatus according to the first embodiment shown in FIGS. 1A to 1C.

As shown in FIG. 7, the paper sheet authentication apparatus 10 includes the hopper 11 on which the paper sheet that is the target of the authentication is set, the transport unit 12 that transports the paper sheet, the line sensor 13 that acquires an image of the paper sheet, the fluorescence sensor 14 that detects the fluorescent light characteristic on the scan line on the paper sheet, the stacking unit 15 that receives the paper sheet that is determined to be a genuine paper sheet, the reject unit 16 that has an opening from where the paper sheet that is determined to be not a genuine paper sheet is discharged, a storage unit 17, and a control unit 18.

The storage unit 17 is a storage device such as a hard disk drive, a nonvolatile memory, and the like. The storage unit 17 stores a paper sheet database 17*a*, fluorescence sensor acquired data 17*b*, data after time-axis adjustment 17*c*, data before level correction 17*d*, data after level correction 17*e*, data per band 17*f*, and fluorescent light characteristic data 17*g*.

The paper sheet database 17*a* stores therein, in connection with a paper sheet recognition code as a recognition result of a paper sheet, characteristic data obtained previously from image data of a genuine paper sheet, and data relating to the fluorescent light characteristic generated from information acquired previously from a genuine paper sheet. In detail, the paper sheet recognition code contains information relating to at least one of the type of the paper sheet and a transport direction of the paper sheet. When there are multiple types of the paper sheets, multiple transport directions, multiple fluorescence sensors, and channel numbers are allocated to the fluorescence sensors, the paper sheet database 17*a* stores therein a channel number and the fluorescent light characteristic data of a genuine paper sheet for each of the excitation wavelengths (A to D) of the light sources (145*a* to 145*d*) and for each of the light receiving bands (1 to 3) of the receiving unit 142. In the present embodiment, an example has been explained in which a plurality of data acquired at each sample point is used as the fluorescent light characteristic data stored for a genuine paper sheet. In an alternative configuration, the fluorescent light characteristic data may be a statistical value such as a peak value, an integral value or an average value for a predetermined region, normalizing values of these, and the like.

The fluorescence sensor acquired data 17*b* includes data relating to intensities of lights received by the first receiving unit 142*a*, the second receiving unit 142*b*, and the third receiving unit 142*c* per wavelength of the excitation lights per timing at which the data was acquired for a point on the scan line, or per predetermined distance.

As shown in FIG. 4A, the first receiving unit 142*a* to the fourth receiving unit 142*d* measure an intensity of light by using photodiodes arranged at physically different positions depending on the band of the wavelength to be received. The details will be explained below; however, the difference in the physical positions of the receiving units with respect to the transport direction of the paper sheet corresponds to a time difference in acquiring the data at the same point of the paper sheet. The data after time-axis adjustment 17*c* is obtained by correcting a time difference in the fluorescence sensor acquired data 17*b*.

The data before level correction 17*d* is obtained by subtracting from the data after time-axis adjustment 17*c* a portion included therein corresponding to an offset signal of an operational amplifier for the photodiode, and further making correction so that a minimum value of the signal of each photodiode becomes zero.

The data after level correction 17*e* is obtained by multiplying the data before level correction 17*d* with a predetermined factor. The predetermined factor is for correcting a detection sensitivity difference caused by the physical positional relationship between the four light sources (i.e., the first light source 145*a*, the second light source 145*b*, the third light source 145*c*, and the fourth light source 145*d*) and the three receiving units (i.e., the first receiving unit 142*a*, the second receiving unit 142*b*, and the third receiving unit 142*c*).

That is, the data after level correction 17*e* is the data obtained by subjecting the fluorescence sensor acquired data 17*b* to a time axis correction and correction of the intensities of lights received by the first receiving unit 142*a*, the second receiving unit 142*b*, and the third receiving unit 142*c*. However, although those corrections have been performed, the intensities of lights received by the first receiving unit 142*a* are the intensities of lights of the bands 1, 2, and 3, the intensities of lights received by the second receiving unit 142*b* are the intensities of lights of the bands 2 and 3, and the intensity of light received by the third receiving unit 142*c* is the intensity of light of the band 3. The data per band 17*f* is obtained from the data after level correction 17*e* by calculating an intensity of light per band. Specifically, when the intensity of light received by the first receiving unit 142*a* is taken as Va, the intensity of light received by the second receiving unit 142*b* is taken as Vb, and the intensity of light received by the third receiving unit 142*c* is taken as Vc, the intensity of light of the wavelength of the band 1 is calculated as (Va-Vb) and the intensity of light of the wavelength of the band 2 is calculated as (Vb-Vc). These arithmetic calculations may be performed in a circuit of the operational amplifier, or may be performed with a digital data obtained by performing A/D conversion.

The fluorescent light characteristic data 17*g* is obtained, to correct a level difference in the detected signal due to presence of soil on the paper sheet or due to a difference between face and back orientations of the paper sheet, by normalizing the data per band 17*f* with a maximum value, with the proviso that the data in the neighborhood of the maximum value before the normalization falls within a predetermined range. The fluorescent light characteristic data of a genuine paper sheet contained in the paper sheet database 17*a* has the same format as the fluorescent light characteristic data 17*g*. The authentication of the paper sheet is performed by evaluating the similarity between the fluorescent light characteristic data of a genuine paper sheet contained in the paper sheet database 17*a* and the fluorescent light characteristic data 17*g*.

The control unit 18 totally controls the paper sheet authentication apparatus 10. The control unit 18 includes a transport control unit 18*a*, a paper sheet type recognition unit 18*b*, a fluorescence sensor data acquisition unit 18*c*, a fluorescent light characteristic data generating unit 18*d*, and an authentication unit 18*e*. Computer programs that correspond to the functions of these units are stored in a not-shown ROM or nonvolatile memory, and by loading those programs in a CPU (Central Processing Unit) and executing them, the processes corresponding to these units are realized.

The transport control unit 18*a* controls the transport unit 12 to transport a paper sheet, which was set on the hopper 11 and fed by the feeding unit 51, to the recognition and counting unit 52 in which the line sensor 13, the fluorescence sensors 14, and the like are arranged. The transport control unit 18*a* controls the diverting unit 53 based on the result of the authentication of the paper sheet and transports the paper sheet determined as genuine to the stacking unit 15 and transports the paper sheet determined as not genuine to the reject unit 16.

The paper sheet type recognition unit 18*b* acquires the image data of the paper sheet transported to the recognition and counting unit 52 by using the line sensor 13, generates characteristic data of the image from the acquired image data. By evaluating the similarity between the generated characteristic data of the image and the characteristic data of the image of the paper sheet previously stored in the paper sheet database 17*a*, the paper sheet type recognition unit 18*b* recognizes the type of the paper sheet and assigns a paper sheet recognition code.

The fluorescence sensor data acquisition unit 18*c*, by controlling the fluorescence sensor 14, acquires data relating to the fluorescent light emitted by the paper sheet, which has been transported to the recognition and counting unit 52, and stores the acquired data as the fluorescence sensor acquired data 17*b*. Based on the fluorescence sensor acquired data 17*b* acquired by the fluorescence sensor data acquisition unit 18*c*, the fluorescent light characteristic data generating unit 18*d* generates the data after time-axis adjustment 17*c*, the data before level correction 17*d*, the data after level correction 17*e*, the data per band 17*f*, and the fluorescent light characteristic data 17*g* in order.

The authentication unit 18*e* performs the authentication of the paper sheet by evaluating the similarity between the fluorescent light characteristic data 17*g* generated by the fluorescent light characteristic data generating unit 18*d* and the fluorescent light characteristic data of a genuine paper sheet stored in the paper sheet database 17*a*. Such a determination of the similarity is performed by using the generally known method of similarly determination such as evaluation of a relation between a predetermined threshold value and a correlation value, an absolute sum of a differential value of each point, and the like of both the fluorescent light characteristic data.

Figure 8:
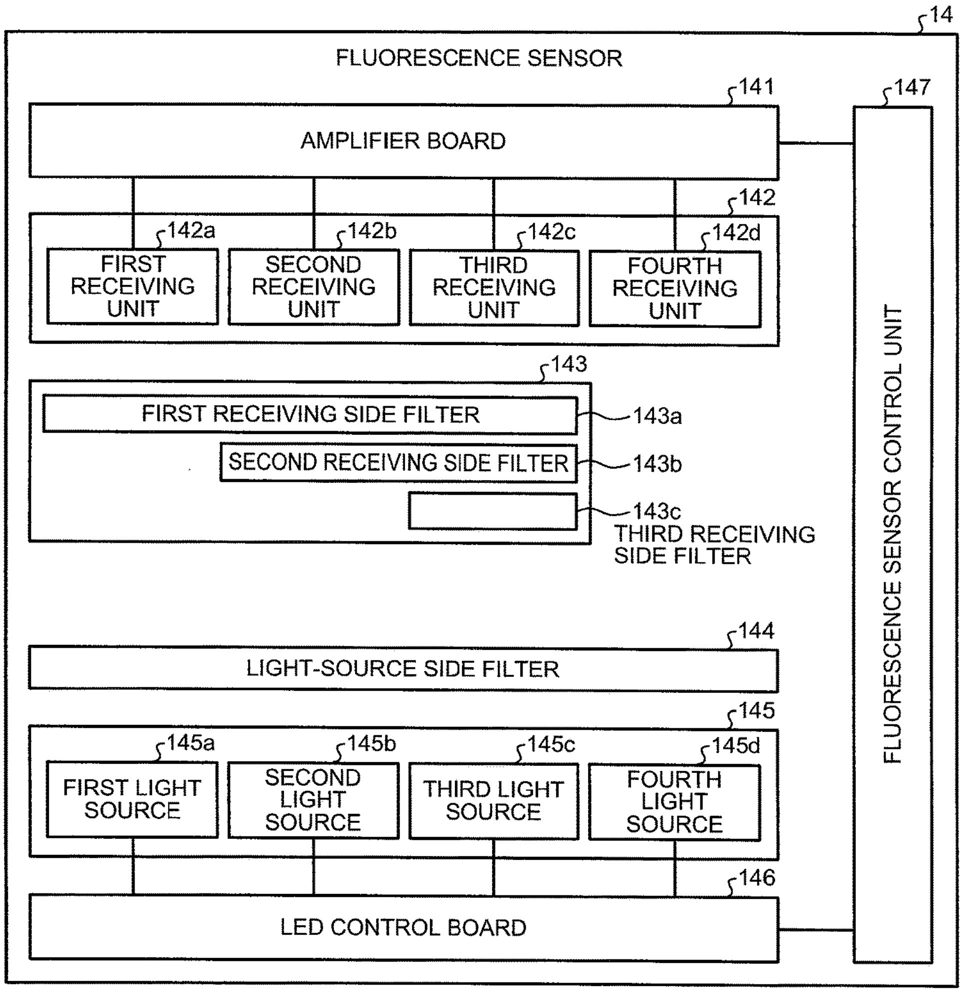
FIG. 8 is a detailed functional block diagram for explaining a detailed functional configuration of the fluorescence sensor shown in FIG. 7.

A detailed functional configuration of the fluorescence sensor 14 shown in FIG. 7 is explained below by using FIG. 8. The fluorescence sensor 14 includes an amplifier board 141, the receiving unit 142, the receiving side filter 143, the light-source side filter 144, the light source 145, an LED control board 146, and a fluorescence sensor control unit 147.

The amplifier board 141 amplifies signal intensity of the light received by the receiving unit 142. The receiving unit 142 is a four-divided photodiode made from silicon having a wavelength detection range between approximately 190 nm to 1100 nm, and includes the first receiving unit 142*a*, the second receiving unit 142*b*, the third receiving unit 142*c*, and the fourth receiving unit 142*d*.

The receiving side filter 143 is a band pass filter that passes a light of the different wavelength ranges corresponding to each of the four receiving units of the receiving unit 142, and includes the first receiving side filter 143*a*, the second receiving side filter 143*b*, and the third receiving side filter 143*c*. The first receiving side filter 143*a* passes the light having the wavelength λ1 or longer, the second receiving side filter 143*b* passes the light having the wavelength A2 or longer, and the third receiving side filter 143*c* passes the light having the wavelength A3 or longer.

The first receiving side filter 143*a* filters the light that enters the first receiving unit 142*a*, the second receiving unit 142*b*, and the third receiving unit 142*c*; the second receiving side filter 143*b* filters the light that enters the second receiving unit 142*b* and the third receiving unit 142*c*; and the third receiving side filter 143*c* filters the light that enters the third receiving unit 142*c*. Accordingly, the first receiving unit 142*a* detects the intensity of light having the wavelength λ1 or longer, the second receiving unit 142*b* detects the intensity of light having the wavelength λ2 or longer, and the third receiving unit 142*c* detects the intensity of light having the wavelength λ3 or longer. The fourth receiving unit 142*d* can detect the intensities of the lights of all the wavelengths, as it is not provided with any filter.

The light-source side filter 144 is an infrared light cutting filter that passes only light of a wavelength 650 nm or less. The light source 145 includes four light emitting diodes, and the light emitting diodes respectively emit visible lights of different wavelengths. The first light source 145*a* emits a visible light having the wavelength A, the second light source 145*b* emits a visible light having the wavelength B, the third light source 145*c* emits a visible light having the wavelength C, and the fourth light source 145*d* emits a visible light having the wavelength D.

The LED control board 146 controls the emission intensity of light emitted by the light emitting diodes of the light source 145. The fluorescence sensor control unit 147 controls, as shown in FIG. 6, light emitting timings of the first light source 145*a*, the second light source 145*b*, the third light source 145*c*, and the fourth light source 145*d*, and an acquisition timing of the received light intensity data by the receiving unit 142.

A characteristic of the fluorescence sensor acquired data 17*b* acquired by the fluorescence sensor 14 having the physical structure shown in FIGS. 4A and 4B is explained below by using FIG. 9.

Figure 9:
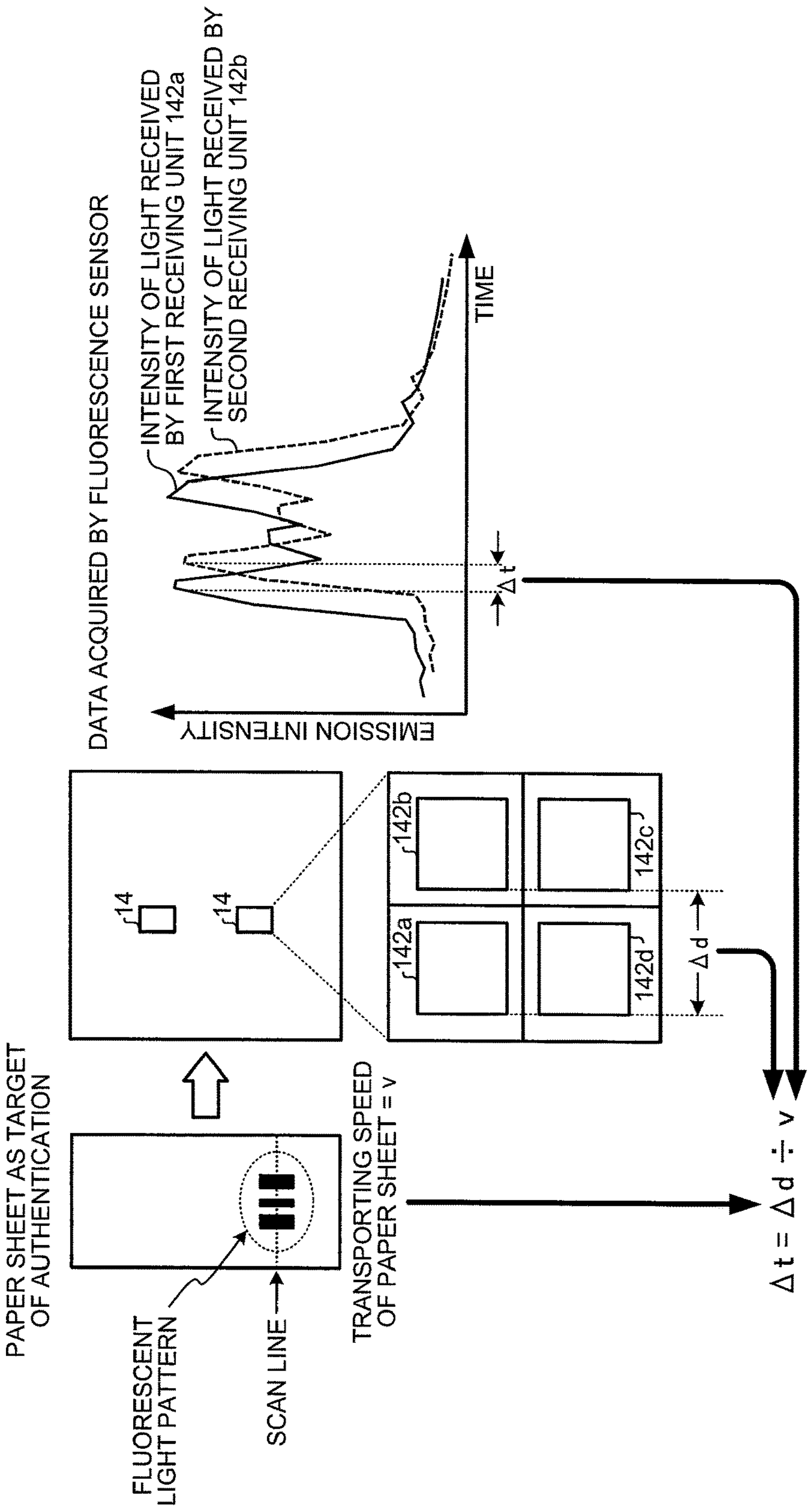
FIG. 9 is an explanatory drawing for explaining a characteristic of fluorescence sensor acquired data acquired by the fluorescence sensor having the physical structure shown in FIGS. 4A and 4B.

In the example shown in FIG. 9, a part of the fluorescence sensor acquired data 17*b* acquired by the fluorescence sensor 14 is shown. In this example, the fluorescence sensor acquired data 17*b* acquired by the fluorescence sensor 14 is the data relating to the fluorescent light emitted from the paper sheet, on which the fluorescent material is printed. And using the fluorescent material that emits light in the band 2 when irradiated with an excitation light of the wavelength A, the fluorescent light pattern is printed as shown in FIG. 9. The graph shown in FIG. 9, in the data acquired by the fluorescence sensor 14 shows a relation between a timing at which the first receiving unit 142*a* and the second receiving unit 142*b* perform the scanning on the scan line, and the detected intensity of light, when the paper sheet is irradiated with the excitation light of the wavelength A.

Because the fluorescent material that emits the fluorescent light in the band 2 is used, it is ideal that identical data are acquired in both the first receiving unit 142*a* and the second receiving unit 142*b*; however, as shown in the drawing, there is a difference of Δd between the physical positions of the first receiving unit 142*a* and the second receiving unit 142*b* with respect to the transport direction of the paper sheet. Accordingly, although the waveform of the data acquired by the first receiving unit 142*a*, which is arranged upstream in the paper sheet transport direction, resembles the waveform of the data acquired by the second receiving unit 142*b*, which is arranged downstream, there is a time difference of Δt between the timings at which the peaks of the two waveforms appear. When the transport speed of the paper sheet is assumed to be v, this time difference can be calculated as Δt=Δd/v.

The data after time-axis adjustment 17*c* is data obtained by correcting timing in the fluorescence sensor acquired data 17*b* that includes a time difference caused from the differences among the physical positions of the first receiving unit 142*a*, the second receiving unit 142*b*, and the third receiving unit 142*c* with respect to the transport direction of the paper sheet as shown in FIG. 9. The correction of the timing between measurements at the first receiving unit 142*a* and the second receiving unit 142*b* is explained by using FIG. 9; however, similar correction of the timing is necessary for between the first receiving unit 142*a* and the third receiving unit 142*c*.

Because the data per band 17*f* is generated by calculation using detected values detected by the first receiving unit 142*a*, the second receiving unit 142*b*, and the third receiving unit 142*c*, the time difference must be corrected beforehand when generating the data per band 17*f*.

Figure 10:
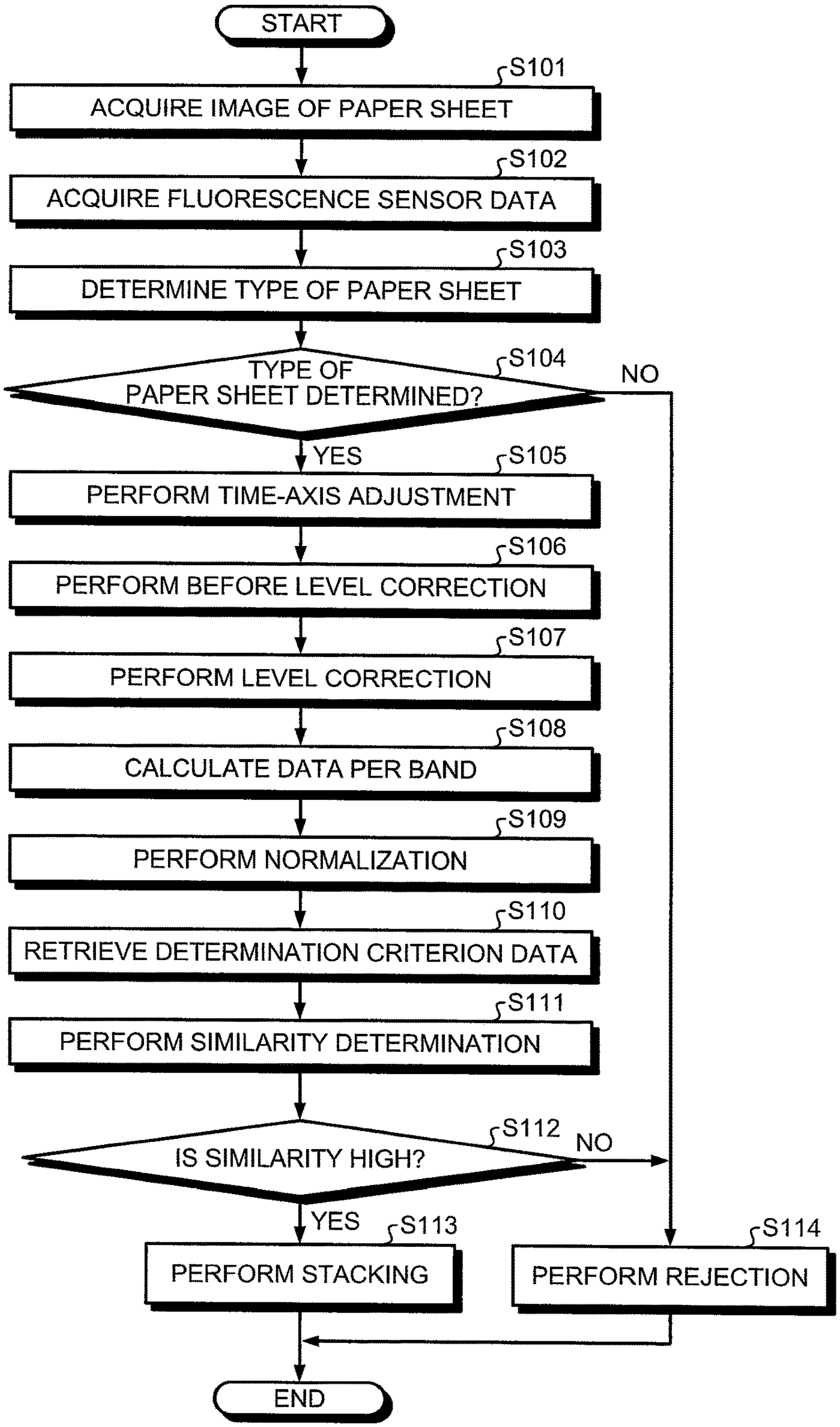
FIG. 10 is a flowchart of a paper-sheet authentication process performed by the paper sheet authentication apparatus shown in FIGS. 1A to 1C.

A paper-sheet authentication process performed by the paper sheet authentication apparatus 10 shown in FIGS. 1A to 1C is explained below by using FIG. 10.

At first, the paper sheet type recognition unit 18*b* starts acquiring, by using the line sensor 13, the image of the paper sheet fed out to the transport unit 12 from the hopper 11 (Step S101). Moreover, the fluorescence sensor data acquisition unit 18*c* acquires, in parallel to the image acquisition by the paper sheet type recognition unit 18*b*, fluorescence sensor data by using the fluorescence sensor 14, and stores the acquired data as the fluorescence sensor acquired data 17*b* (Step S102).

If the acquisition of the image data of the paper sheet is finished, the paper sheet type recognition unit 18*b* generates the characteristic data of the image from the acquired image data, evaluates the similarity between the generated characteristic data and the image characteristic data of the paper sheet previously stored in the paper sheet database 17*a*, and recognizes the type of the paper sheet by finding out a paper sheet having the similarity that satisfies a predetermined criterion (Step S103). When the similarity between the characteristic data generated from the image data and each of the image characteristic data of the paper sheet previously stored in the paper sheet database 17*a* does not satisfy the predetermined criterion (NO at Step S104), because it is not possible to determine the type of the paper sheet, it is recognized that the paper sheet cannot be handled as the target of the authentication by this device, and the inputted paper sheet is transported to the reject unit 16 (Step S114), and the process procedure is terminated.

When the similarity between the characteristic data generated from the image data and any one of the image characteristic data of the paper sheet previously stored in the paper sheet database 17*a* satisfies the predetermined criterion (YES at Step S104), the type of the inputted paper sheet is determined to be one of those registered in the paper sheet database 17*a* that satisfy the predetermined criterion of the similarity. In this case, the fluorescent light characteristic data generating unit 18*d* performs the correction of the time axis on the fluorescence sensor acquired data 17*b* and stores the data after the correction as the data after time-axis adjustment 17*c* (Step S105).

Moreover, the fluorescent light characteristic data generating unit 18*d* subtracts from the data after time-axis adjustment 17*c* a portion corresponding to an offset voltage of the amplifier circuit that amplifies the signal of the photodiode included therein, further, makes correction so that a minimum value of the signal of each of the photodiodes becomes zero, and stores the data after the correction as the data before level correction 17*d* (Step S106). The fluorescent light characteristic data generating unit 18*d* multiplies the data before level correction 17*d* with a predetermined factor and stores the result as the data after level correction 17*e* (Step S107). The predetermined factor is for correcting a detection sensitivity difference caused by the physical positional relationship between the four light sources (i.e., the first light source 145*a*, the second light source 145*b*, the third light source 145*c*, and the fourth light source 145*d*) and the three receiving units (i.e., the first receiving unit 142*a*, the second receiving unit 142*b*, and the third receiving unit 142*c*).

The fluorescent light characteristic data generating unit 18*d* calculates the data per band 17*f* from the data after level correction 17*e* (Step 108), and to correct a level difference in the detected signal due to presence of dirt on the paper sheet or due to face/back orientation of the paper sheet present in the data per band 17*f*, normalizes the data per band 17*f* with a maximum value, and stores the result as the fluorescent light characteristic data 17*g* (Step S109).

The authentication unit 18*e* retrieves from the paper sheet database 17*a* determination criterion data of the fluorescent light characteristic data at a specific position corresponding to the type of the paper sheet identified at Step S103 (Step S110), and performs the similarity determination in a specific region between the retrieved data and the fluorescent light characteristic data 17*g* of the paper sheet normalized at Step S109 (Step S111). The method of performing this similarity determination may be changed depending on the necessary stringency and the number of the types of the paper sheets that are the targets of the authentication. For example, when higher stringency is necessary, the number of types of the paper sheets that are the targets of the authentication is large, or the like, for each block defined based on the band, shown in FIG. 2A, which represents a range of the wavelength of the excitation light and the wavelength of the fluorescent light, the similarity of the shape of graph that indicates a relation between the timing at which the scanning is performed on the scan line on the paper sheet and the intensity of the fluorescent light is evaluated, and when it is determined that the similarity of the graphs of all the blocks is high, it may be determined that the paper sheet is a genuine paper sheet. In this case, when there are multiple types of the paper sheets, multiple transport directions, and multiple fluorescence sensors, and if a channel number is assigned to each of the fluorescence sensors, the determination criterion data is prepared for each of the channel numbers. Moreover, as the fluorescent light characteristic data, whether the entire graph is to be used, or whether a portion of the graph having a distinct characteristic is to be used can be selected appropriately. In contrast, when higher stringency is not necessary, the number of types of the paper sheets that are the targets of the authentication is small, or the like, and if the presence/absence of the fluorescent light matches for each block defined based on the band, shown in FIG. 2A, which represents a range of the wavelength of the excitation light and the wavelength of the fluorescent light, it may be determined that the paper sheet is a genuine paper sheet. For determining the presence/absence of the fluorescent light, it is possible to use an integral value, an average value, a peak value, or the like for a predetermined region width.

If it is determined at Step S111 that the similarity is high between the fluorescent light characteristic data 17*g* of the inputted paper sheet and the fluorescent light characteristic data, which corresponds to the type of the paper sheet determined at Step S103 and retrieved from the paper sheet database 17*a* (YES at Step S112), the transport control unit 18*a* transports the inputted paper sheet and stacks in the stacking unit 15 (Step S113), and terminates the process procedure. In contrast, if it is determined at Step S111 that the similarity is not high (NO at Step S112), the inputted paper sheet is transported and discharged to the reject unit 16 (Step S114), and the process procedure is terminated.

In the first embodiment, as explained above, the type of the paper sheet is determined based on the characteristic of the image data of the paper sheet. Moreover, by using the light emitting diodes that emit lights having different wavelengths, each of the excitation lights having different wavelengths illuminates the paper sheet sequentially. Moreover, by using a sensor that can measure the intensity of light per band, which indicates a wavelength range, by combining the filters that pass lights having different wavelength ranges and the four-divided photodiode that can measure the intensity of the received light, the fluorescent light characteristic data which is the intensity of the fluorescent light corresponding to the wavelength of the excitation light emitted on the paper sheet and the band of the light emitted from the paper sheet is acquired. Because the authentication of the paper sheet is performed by comparing the fluorescent light characteristic data of the paper sheet acquired in this manner with the fluorescent light characteristic data of the genuine paper sheet previously stored for each type of the paper sheet, the authentication of several types of the paper sheets to which fluorescent materials having different fluorescent light characteristics are applied can be performed speedily and easily.

Second Embodiment

In the first embodiment, the fluorescent light characteristic is detected by using the reflective fluorescence sensor 14. Moreover, in the first embodiment, the material of the photodiodes used in the receiving unit 142 is silicon, by which the wavelength of the light that could be detected is in the range of approximately 190 nm to 1100 nm. However, some materials emit a light that is not a visible light, some materials emit a light having a wavelength longer than 1100 nm, and some materials continue to emit a light even if the irradiation with the excitation light is stopped. The light emitted continually after stopping the irradiation with the excitation light is particularly referred to as phosphorescent light. In the second embodiment, a transmissive fluorescence sensor 24 that is not reflective-type is used, an infrared light is used as the excitation light, and a photodiode made from indium gallium arsenic, which can detect a light having a wavelength band longer than in the first embodiment, is used. Moreover, the authentication of the paper sheet is performed by using not only the emission property while the paper sheet is being irradiated with the excitation light but also emission property after stopping the irradiation with the excitation light, that is, the emission property of the phosphorescent light.

A fluorescent light characteristic of a fluorescent material applied to a paper sheet in the second embodiment and a characteristic of a receiving unit 242 of the fluorescence sensor 24 are explained below by using FIG. 11.

In the first embodiment, the target of the authentication is a paper sheet to which such a fluorescent material is applied that emits a fluorescent light when irradiated with excitation lights having wavelengths A, B, C, D that are in the visible light range, and that emits an infrared light having a wavelength 1100 nm or shorter that is detectable with a photodiode made from silicon. In contrast, in the second embodiment, the target of the authentication is a paper sheet to which such a fluorescent material is applied that emits a fluorescent light or a phosphorescent light when irradiated with excitation lights having wavelengths A', B', C' or D' that are in the infrared light range, and that emits an infrared light having a wavelength 2600 nm or shorter, which is longer than A', that is detectable with a photodiode made from indium gallium arsenic.

In the second embodiment, three bands for detecting the fluorescent light or the phosphorescent light are allocated in the wavelength range that is longer than the wavelength A' of the excitation light. Specifically, a region having the wavelength in the range of λ1' or longer and shorter than λ2' is taken as a band 1, a region having the wavelength in the range of λ2' or longer and shorter than λ3' is taken as a band 2, and a region having the wavelength in the range of λ3' or longer and shorter than λ4' is taken as a band 3. Moreover, in the second embodiment, the detection range is divided into 12 blocks: A'1 to A'3, B'1 to B'3, C'1 to C'3, and D'1 to D'3. The block A'1 is a block of the band 1 in which the peak wavelength of the spectrum of the excitation light is A' and the wavelength of the fluorescent light is in the range of λ1' or longer and shorter than λ2'. The block A'2 is a block of the band 2 in which the peak wavelength of the spectrum of the excitation light is A' and the wavelength of the fluorescent light is in the range of λ2' or longer and shorter than λ3'. The block A'3 is a block of the band 3 in which the peak wavelength of the spectrum of the excitation light is A' and the wavelength of the fluorescent light is in the range of λ3' or longer and shorter than A4'. Similarly, B'1 to B'3 are blocks in which the peak wavelength of the spectrum of the excitation light is B', C'1 to C'3 are blocks in which the peak wavelength of the spectrum of the excitation light is C', and D'1 to D'3 are blocks in which the peak wavelength of the spectrum of the excitation light is D'.

Moreover, in the first embodiment, the intensity of fluorescent light on the scan line per block was measured; however, in the second embodiment, the intensities of both the fluorescent light and the phosphorescent light are measured, and the authentication of the paper sheet is performed by comparing those two measured intensities with those of the genuine paper sheet.

Figure 12A:
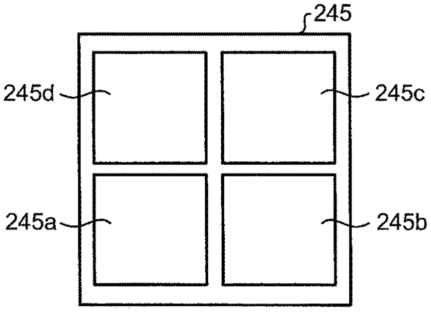
FIGS. 12A to 12C are internal structural drawings for explaining a structure of a transmissive fluorescence sensor used in the second embodiment.
Figure 12B:
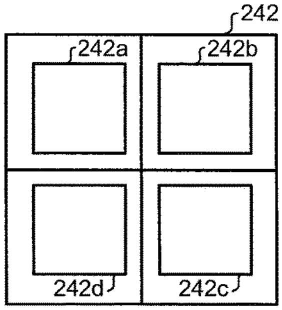
Figure 12C:
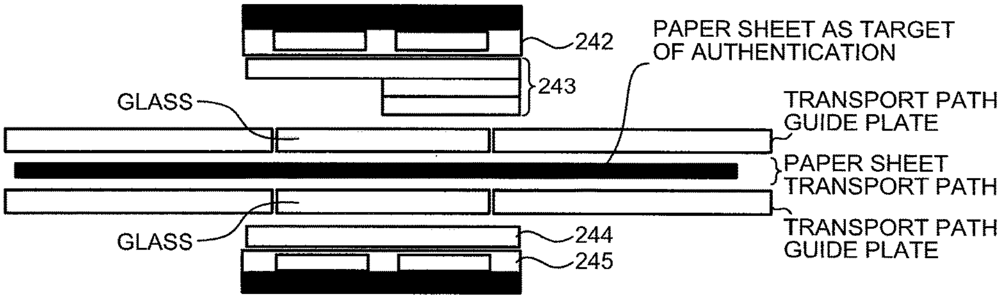

A structure of the transmissive fluorescence sensor 24 used in the second embodiment is explained by using FIGS. 12A to 12C. FIG. 12A is a view of a light source 245, which is the light source of the excitation light of the fluorescence sensor 24, when seen from the paper sheet transport path. FIG. 12B is a view of a structure of the receiving unit 242, which detects the fluorescent light and the phosphorescent light, when seen from the paper sheet transport path. FIG. 12C is a cross-sectional view of the transmissive fluorescence sensor 24 when cut along a vertical plane that is parallel to the transport direction of the paper sheet.

A structure of the light source 245 is explained below by using FIG. 12A. The light source 245 is a light emitting diode that emits four excitation lights having different wavelengths. A first light source 245*a* emits an excitation light having the wavelength A', a second light source 245*b* emits an excitation light having the wavelength B', a third light source 245*c* emits an excitation light having the wavelength C', and a fourth light source 245*d* emits an excitation light having the wavelength D'.

The structure of the receiving unit 242 is explained by using FIG. 12B. The receiving unit 242 is a four-divided photodiode in which a single substrate made of indium gallium arsenic is divided into four divisions and one photodiode is arranged in each of those divisions. The four photodiodes can independently measure an intensity of received light. Moreover, the four photodiodes can respectively measure the intensity of light in different wavelength range by the presence of a receiving side filter 243 shown in FIG. 12C. A first receiving unit 242*a* measures an intensity of light of the band 1 having the wavelength range of λ1' or longer and shorter than λ2', a second receiving unit 242*b* measures an intensity of light of the band 2 having the wavelength range of λ2' or longer and shorter than λ3', a third receiving unit 242*c* measures an intensity of light of the band 3 having the wavelength range of λ3' or longer and shorter than λ4', and a fourth receiving unit 242*d* measures the intensity of the received light without performing wavelength filtering.

The structure of the transmissive fluorescence sensor 24 is explained below by using the cross-sectional view of the transmissive fluorescence sensor 24 shown in FIG. 12C. As shown in FIG. 12C, the fluorescence sensor 24 includes the light source 245 and the receiving unit 242 arranged across the paper sheet transport path. The light source 245 is arranged below the paper sheet transport path, and the receiving unit 242 is arranged above the paper sheet transport path. When the excitation light is emitted from the light source 245, the excitation light passes through a light-source side filter 244 and falls on the paper sheet that is the target of the authentication. The fluorescent light and the phosphorescent light emitted by the fluorescent material applied to the paper sheet pass through the paper sheet and are filtered by the receiving side filter 243, and the intensity of light received per band is detected by the receiving unit 242. The light-source side filter 244 is a filter that filters out the light having a wavelength of λ1' or longer. Accordingly, the light-source side filter 244 prevents a component of light emitted by the light source 245 having the wavelength of λ1' or longer from being received by the receiving unit 242 by filtering out the component of light emitted by the light source 245 having the wavelength of λ1' or longer. Thus, the receiving unit 242 can detect only light having the wavelength of λ1' or longer contained in the fluorescent light or the phosphorescent light.

When no paper sheet is being processed, the fourth receiving unit 242*d* is used to perform automatic maintenance. When performing the automatic maintenance, the light source 245 is turned on in a state in which no paper sheet is present on the transport path, and a light is received in the fourth receiving unit 242*d*. The intensity of light received by the fourth receiving unit 242*d* is measured after turning on the light emitting diodes of the four light sources one by one. In comparison with the intensity of light when everything is normal, if the measured intensity is lower than a predetermined threshold intensity, it is determined that there is a failure. Moreover, even if the measured intensity of light is higher than the failure determination threshold intensity for each of the four light sources, but if it is different from a proper intensity which was obtained in a normal state, the intensity of the excitation light can be adjusted by adjusting a current supplied to the light emitting diode.

Figure 13:
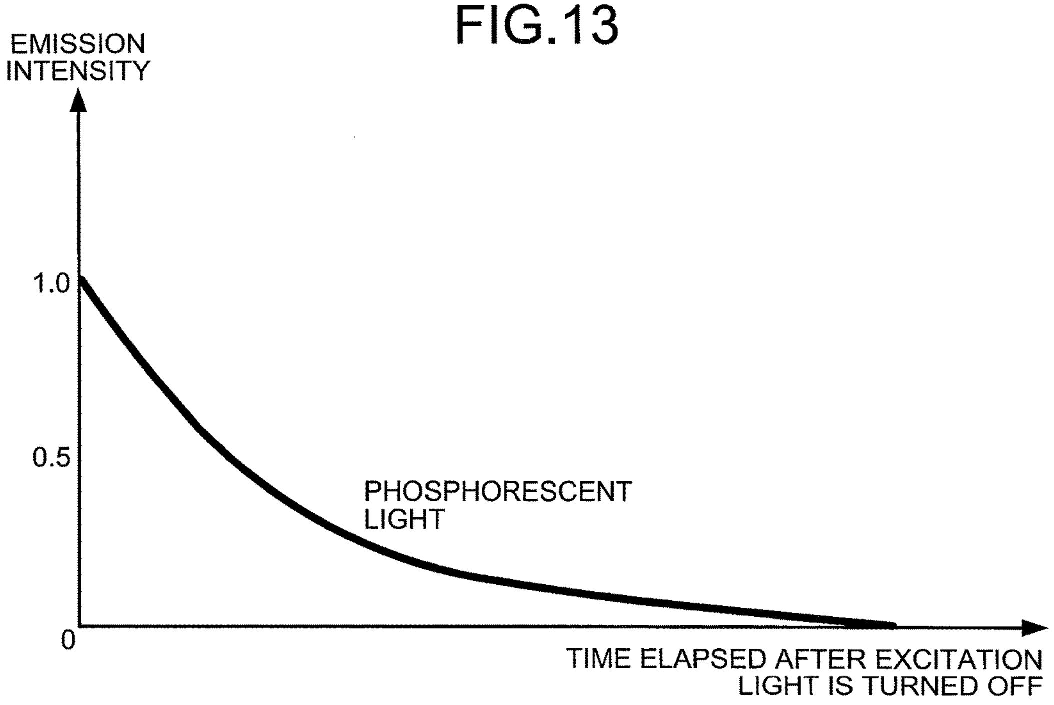
FIG. 13 is an explanatory drawing for explaining a persistence characteristic of a light emitted by a phosphorescent material.

A persistence characteristic of light emission by a phosphorescent material is explained below by using FIG. 13.

Some fluorescent materials have a phosphorescent light characteristic by which they continue to emit a light even if the irradiation with the excitation light is stopped. In the graph shown in FIG. 13, the horizontal axis represents an elapsed time after the excitation light is turned off and the vertical axis represents an intensity of light. The intensity of light shown on the vertical axis is expressed as a ratio when the intensity at the time of irradiation with the excitation light is taken as "1". When the excitation light radiates on a material that exhibits the phosphorescence characteristic and when the irradiation with the excitation light is stopped, the intensity of light emitted by such a material gradually decreases and the decrease becomes gentle as the time passes. In this manner, when the excitation light having a predetermined wavelength radiate on material that exhibits the phosphorescence characteristic, it is possible to detect the phosphorescent light even if certain time has passed after the irradiation with the excitation light is stopped.

This characteristic of the phosphorescent light that the emission of light continues for some time even after stopping the irradiation with the excitation light is not exhibited by ordinary fluorescent material. Therefore, by using this light emission characteristic, which remains even after stopping the irradiation with the excitation light, in the authentication of the paper sheet, the stringency of the determination can be improved.

A lighting timing of the light source 245 of the fluorescence sensor 24 and a measurement timing of the intensity of light received by the receiving unit 242, which are shown in FIGS. 12A to 12C, are explained below by using FIG. 14.

As for the light source, the first light source 245*a* that emits the light having the wavelength A' is turned on at a time point t1 and turned off at a time point t4, the second light source 245*b* that emits the light having the wavelength B' is turned on at a time point t7 and turned off at a time point t10, the third light source 245*c* that emits the light having the wavelength C' is turned on at a time point t13 and turned off at a time point t16, and the fourth light source 245*d* that emits the light having the wavelength D' is turned on at a time point t19 and turned off at a time point t22. In the receiving unit 242, at the timing when a predetermined time has elapsed from the time point at which the respective light sources have stopped emitting the light after starting the emission, the intensity of light received by the first receiving unit 242*a*, the second receiving unit 242*b*, and the third receiving unit 242*c*, respectively, are acquired.

Specifically, the first receiving unit 242*a*, the second receiving unit 242*b*, and the third receiving unit 242*c* acquire the intensities of the fluorescent light and the phosphorescent light received between time points t2 and t3 that are between the time points t1 and t4 while the first light source 245*a* is emitting the light. Moreover, the first receiving unit 242*a*, the second receiving unit 242*b*, and the third receiving unit 242*c* acquire the intensity of the phosphorescent light received between a time point t5, which is the timing when a predetermined time has elapsed from the time point at which the first light source 245*a* is turned off, and a time point t6.

The first receiving unit 242*a*, the second receiving unit 242*b*, and the third receiving unit 242*c* acquire the intensities of the fluorescent light and the phosphorescent light received between time points t8 and t9 that are between the time points t7 and t10 while the second light source 245*b* is emitting the light. Moreover, the first receiving unit 242*a*, the second receiving unit 242*b*, and the third receiving unit 242*c* acquire the intensity of the phosphorescent light received between a time point t11, which is the timing when a predetermined time has elapsed from the time point at which the second light source 245*b* is turned off, and a time point t12.

The first receiving unit 242*a*, the second receiving unit 242*b*, and the third receiving unit 242*c* acquire the intensities of the fluorescent light and the phosphorescent light received between time points t14 and t15 that are between the time points t13 and t16 while the third light source 245*c* is emitting the light. Moreover, the first receiving unit 242*a*, the second receiving unit 242*b*, and the third receiving unit 242*c* acquire the intensity of the phosphorescent light received between a time point t17, which is the timing when a predetermined time has elapsed from the time point at which the third light source 245*c* is turned off, and a time point t18.

The first receiving unit 242*a*, the second receiving unit 242*b*, and the third receiving unit 242*c* acquire the intensities of the fluorescent light and the phosphorescent light received between time points t20 and t21 that are between the time points t19 and t22 while the fourth light source 245*d* is emitting the light. Moreover, the first receiving unit 242*a*, the second receiving unit 242*b*, and the third receiving unit 242*c* acquire the intensity of the phosphorescent light received between a time point t23, which is the timing when a predetermined time has elapsed from the time point at which the fourth light source 245*d* is turned off, and a time point t24.

An internal functional configuration of a paper sheet authentication apparatus 20 according to the second embodiment is explained below by using FIG. 15. With respect to the internal configuration of the paper sheet authentication apparatus 20 shown in FIG. 15, the components that are the same as those of the paper sheet authentication apparatus 10 according to the first embodiment are assigned with the same reference numbers and explanation thereof is omitted, and explanation is given of only the components that are different.

The fluorescence sensor 24 has a transmissive structure as shown in FIGS. 12A to 12C and the excitation light emitted by the light source 245 is an infrared light. The receiving unit 242 is a photodiode made from indium gallium arsenic and can detect an infrared light having a longer wavelength band as compared to the photodiode of the first embodiment made from silicon. Because not only the fluorescent light or the phosphorescent light while the excitation light is radiating is detected, but also the phosphorescent light after stopping the irradiation with the excitation light is detected, as explained with respect to FIG. 14, corresponding to the light emitting timing of each light source, it is possible to measure the intensity of the fluorescent light or the intensity of the phosphorescent light when the light source is emitting the light as well as measure the intensity of the phosphorescent light after the light source has been turned off.

Figure 14:
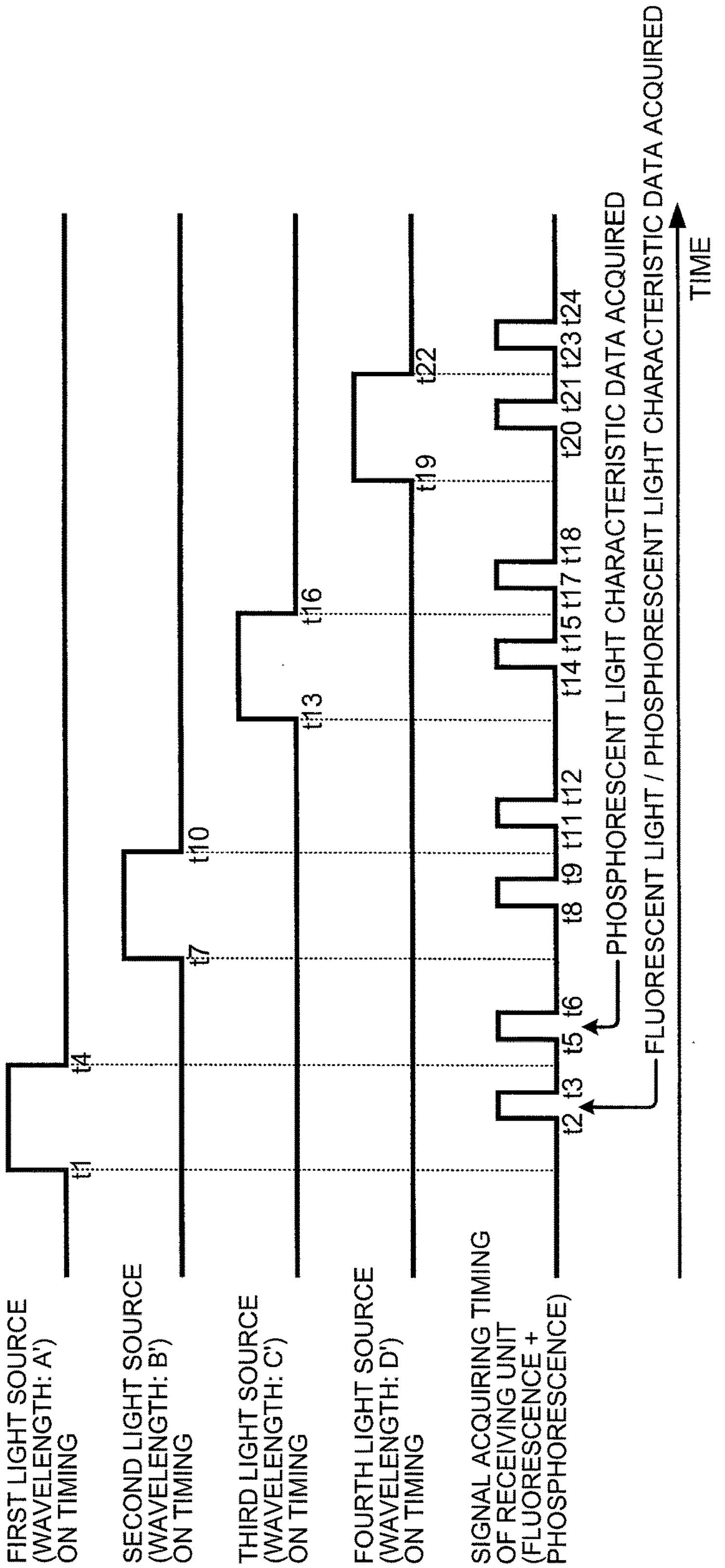
FIG. 14 is a view for explaining a lighting timing of light sources of the fluorescence sensor and a measurement timing of an intensity of light received by a receiving unit shown in FIGS. 12A to 12C.
Figure 15:
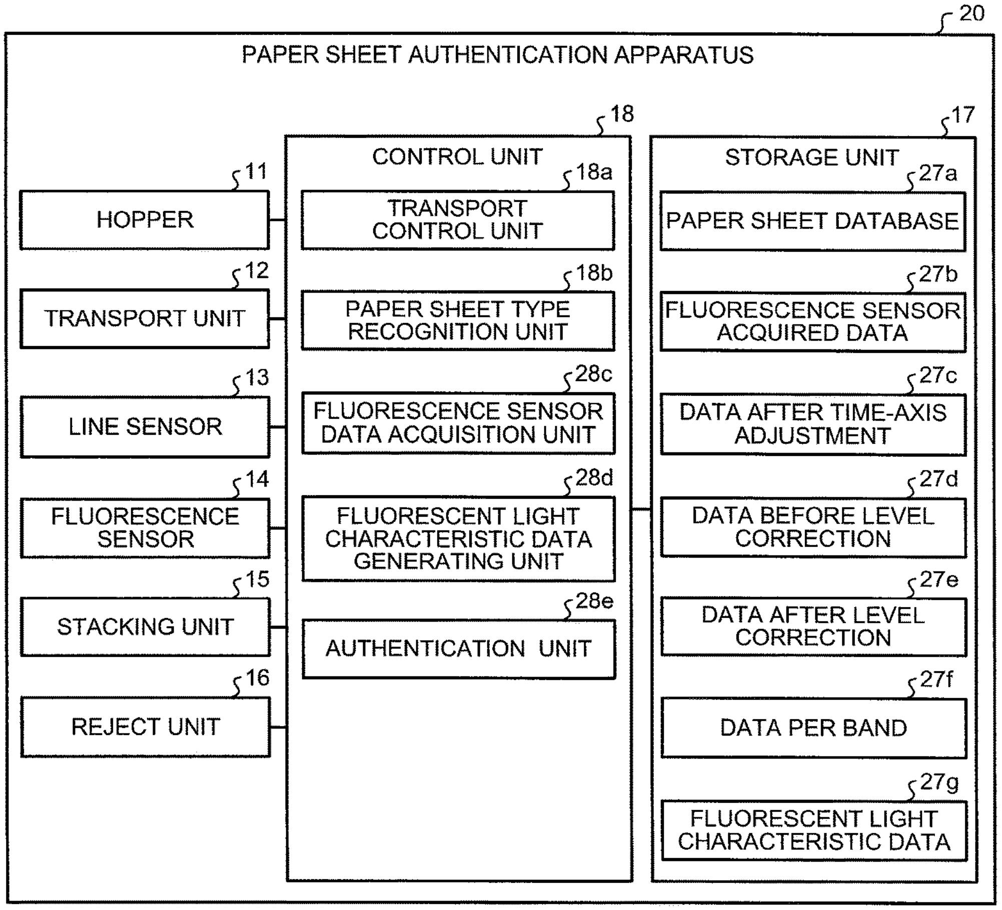
FIG. 15 is a functional block diagram for explaining an internal functional configuration of a paper sheet authentication apparatus according to the second embodiment.

The names of the data stored in the storage unit 17 shown in FIG. 15 are the same as those in the first embodiment; however, a content of each data is different from those in the first embodiment. Specifically, in the second embodiment, because the phosphorescent light is detected after the irradiation with the excitation light is stopped, as shown in FIG. 14, and the detection result of the phosphorescent light after the irradiation with the excitation light is stopped is also used for authenticating the paper sheet, information about the phosphorescent light after the irradiation with the excitation light is stopped is included in each data.

A paper sheet database 27*a* stores therein, in addition to the paper sheet database 17*a* of the first embodiment, in a correlated manner with a paper sheet recognition code that is used for indicating a recognition result of the paper sheet, data of the phosphorescent light characteristic after the irradiation with the excitation light is stopped that is previously generated from information acquired from the genuine paper sheet.

The fluorescence sensor acquired data 17*b*, the data after time-axis adjustment 17*c*, the data before level correction 17*d*, the data after level correction 17*e*, the data per band 17*f*, and the fluorescent light characteristic data 17*g* according to the first embodiment have the same data structure, and they contain the intensities of the fluorescent lights per point on the scan lines of the blocks shown in FIGS. 2A and 2B. The fluorescence sensor acquired data 27*b*, data after time-axis adjustment 27*c*, data before level correction 27*d*, data after level correction 27*e*, data per band 27*f*, and fluorescent light characteristic data 27*g* according to the second embodiment also have the same data structure, and they contain the intensities of the fluorescent lights and the phosphorescent lights per point on the scan lines of the blocks shown in FIG. 11, and the intensities of the phosphorescent lights after the irradiation with the excitation light is stopped. That is, in addition to the information contained in the data according to the first embodiment, the data contain information relating to the intensity of the phosphorescent light after the irradiation with the excitation light is stopped.

Because the function to detect the intensity of the phosphorescent light after the irradiation with the excitation light is stopped has been added to the fluorescence sensor 24, a fluorescence sensor data acquisition unit 28*c* has an additional function, as compared with the fluorescence sensor data acquisition unit 18*c* according to the first embodiment, of storing therein the intensity of the phosphorescent light after the irradiation with the excitation light is stopped and measured by the fluorescence sensor 24 as the fluorescence sensor acquired data 27*b*.

Because, in addition to the data structure of the fluorescence sensor acquired data 17*b* according to the first embodiment, the data structure of the fluorescence sensor acquired data 27*b* contains information relating to the intensities of the phosphorescent lights after the irradiation with the excitation light is stopped, a fluorescent light characteristic data generating unit 28*d* performs a processing relating to the intensity of the phosphorescent light in the same manner as the processing relating to the intensity of the fluorescent light.

An authentication unit 28*e* performs the authentication of the paper sheet based on emission characteristics of the fluorescent light and the phosphorescent light while the excitation light radiates and the characteristic of the phosphorescent light after the irradiation with the excitation light is stopped by using the data relating to the phosphorescence light after the irradiation with the excitation light is stopped that has been added to the paper sheet database 27*a* and the fluorescent light characteristic data 27*g*.

Figure 16:
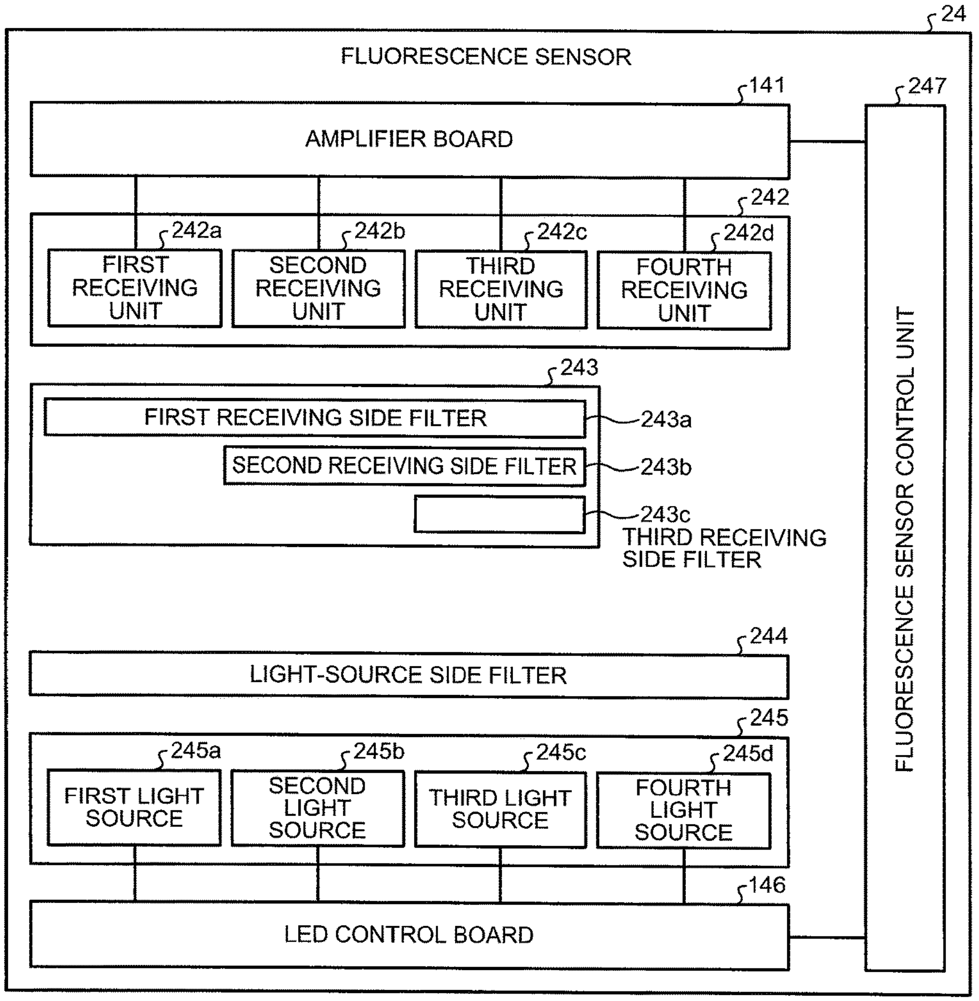
FIG. 16 is a detailed functional block diagram for explaining a detailed functional configuration of the fluorescence sensor shown in FIG. 15.

A detailed functional configuration of the fluorescence sensor 24 shown in FIG. 15 is explained below by using FIG. 16.

The receiving unit 242 is a photodiode made of indium gallium arsenic and can detect an infrared light having a wavelength up to 2600 nm. Thus, in comparison to the receiving unit according to the first embodiment, the receiving unit 242 can detect a light of a longer wavelength. The first receiving unit 242*a*, the second receiving unit 242*b*, the third receiving unit 242*c*, and the fourth receiving unit 242*d* detect intensities of lights having different wavelength bands by using the receiving side filter 243.

A first receiving side filter 243*a* is a filter that does not pass the light having the wavelength shorter than λ1', a second receiving side filter 243*b* is a filter that does not pass the light having the wavelength shorter than λ2', and a third receiving side filter 243*c* is a filter that does not pass the light having the wavelength shorter than λ3'.

The first receiving side filter 243*a* filters the light that enters the first receiving unit 242*a*, the second receiving unit 242*b*, and the third receiving unit 242*c*; the second receiving side filter 243*b* filters the light that enters the second receiving unit 242*b* and the third receiving unit 242*c*; and the third receiving side filter 243*c* filters the light that enters the third receiving unit 242*c*. Accordingly, the first receiving unit 242*a* detects the intensity of light having the wavelength λ1' or longer, the second receiving unit 242*b* detects the intensity of light having the wavelength λ2' or longer, and the third receiving unit 242*c* detects the intensity of light having the wavelength λ3' or longer. The fourth receiving unit 242*d* can detect the intensities of the lights of all the wavelengths as it is not provided with any filter.

The light-source side filter 244 is a filter that passes only light having the wavelength shorter than λ1'. The light source 245 includes four light emitting diodes, and each light emitting diode respectively emits a visible light of a different wavelength. The first light source 245*a* emits an infrared light having the wavelength A', the second light source 245*b* emits an infrared light having the wavelength B', the third light source 245*c* emits an infrared light having the wavelength C', and the fourth light source 245*d* emits an infrared light having the wavelength D'.

A fluorescence sensor control unit 247 controls, as shown in FIG. 14, light emitting timings of the first light source 245*a*, the second light source 245*b*, the third light source 245*c*, and the fourth light source 245*d*, and an acquisition timing of the intensity data of the light received by the receiving unit 242.

In the second embodiment, as explained above, the type of the paper sheet is identified based on the characteristic of the image data of the paper sheet. Moreover, by using the light emitting diodes that emit infrared lights having different wavelengths, the excitation lights, which are infrared lights, having different wavelengths irradiate the paper sheet with one light at one time sequentially. Moreover, by using a sensor that is a combination of the filters that pass lights having different wavelength ranges and the four-divided photodiodes that can measure the intensity of the received light and that can measure the intensity of light per band which indicates a wavelength range, the intensity of the light per band is measured. Furthermore, the fluorescent light characteristic data, which is signal intensity of the received fluorescent light while the excitation light radiates, and the phosphorescent light characteristic data, which is signal intensity of the received phosphorescent light after the irradiation with the excitation light is stopped, are generated and stored in a correlated manner with the wavelength of the excitation light and the bands of the received light. By comparing the fluorescent light characteristic data and the phosphorescent light characteristic data of the paper sheet acquired in this manner with the fluorescent light characteristic data and the phosphorescent light characteristic data of the genuine paper sheet stored previously per type of the paper sheet, the authentication of the paper sheet is performed. Accordingly, by using a material that emits fluorescent/phosphorescent light of the infrared light when irradiated with an infrared light, the authentication of several types of the paper sheets to which phosphorescent/fluorescent materials having different fluorescent/phosphorescent emission characteristic are applied can be performed speedily and easily. Both the fluorescent light characteristic data and the phosphorescent light data can be used, or only one of those can be used, to perform the authentication. Moreover, the authentication may be performed by using the threshold value as explained in the first embodiment.

In the first embodiment and the second embodiment, the target of the authentication is assumed to be a paper sheet; however, such a paper sheet includes valuable securities such as securities, a check and a gift coupon, and a banknote.

In the first embodiment and the second embodiment, an example is explained in which the authentication of the paper sheet, to which is applied a fluorescent material that emits a fluorescent light or a phosphorescent light in an infrared region when irradiated with a visible light or an infrared light, is performed; however, the present invention is not limited to this. That is, it is possible to provide a light source that emits an ultraviolet light, and a photodiode that detects a visible light or an ultraviolet light, and perform the authentication of a paper sheet to which is applied a fluorescent material that emits an ultraviolet light or a visible light when irradiated with an ultraviolet light.

In the first embodiment and the second embodiment, an example is explained in which a four-divided photodiode is used as the receiving units 142 and 242; however, the present invention is not limited to this. For example, plural single photodiodes may be used. Moreover, it is not necessary that the photodiode is divided into four divisions. That is, depending on the type of the fluorescent material applied to the paper sheet that is the target of the authentication, the photodiode may be divided into less or more than four divisions. Furthermore, it is not necessary that all the photodiodes are made of the same material. That is, it is possible to select the material of the photodiodes depending on the wavelength to be detected, and correct the detected intensity based on the detection sensitivity of the photodiodes.

In the first embodiment and the second embodiment, the type of the paper sheet is identified from the characteristic of the image of the paper sheet; however, the present invention is not limited to this. For example, a barcode and the like containing information indicating the type of the paper sheet may be previously printed at a predetermined position on the paper sheet, and the type of the paper sheet can be determined by recognizing the printed information.

The authentication of the paper sheet is performed in the first embodiment by using only the fluorescent light characteristic of the fluorescent material applied to the paper sheet, and the authentication of the paper sheet is performed in the second embodiment by using both the fluorescent/phosphorescent light characteristic of the phosphorescent material/fluorescent material applied to the paper sheet; however, the present invention is not limited to this. That is, the authentication can be performed by using only the phosphorescent light characteristic of the phosphorescent material applied to the paper sheet.

In the first embodiment and the second embodiment, a plurality of filters that filter out a light of a wavelength that is shorter than a predetermined wavelength are used for the receiving side filters 143 and 243 and the intensity of light in a predetermined wavelength range is obtained by performing calculation that uses the measured intensity of the received light; however, the present invention is not limited to this. That is, using a filter that passes only to the predetermined wavelength range, the intensity of light in the predetermined wavelength range may be measured directly.

Figure 11:
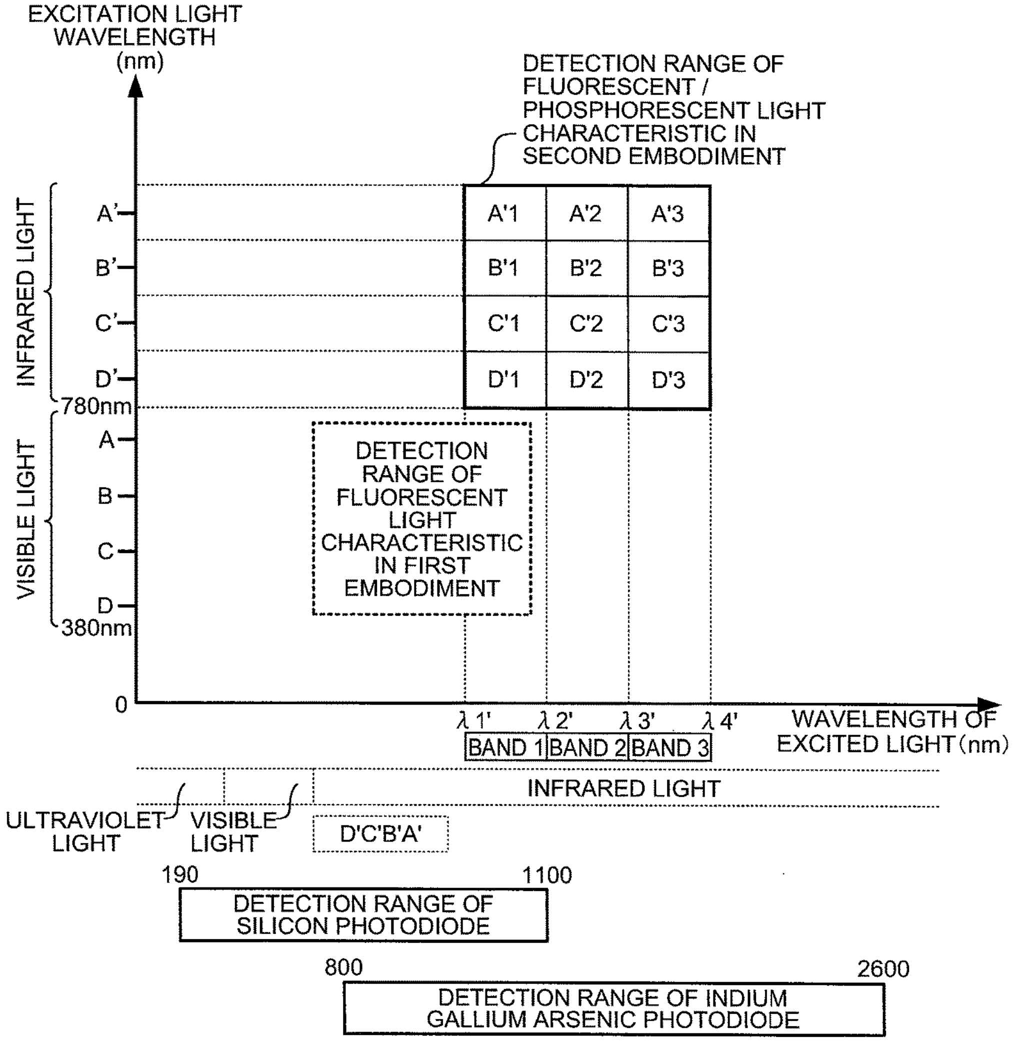
FIG. 11 is an explanatory drawing for explaining a fluorescent light characteristic of a fluorescent material applied to a paper sheet and a characteristic of a receiving unit of a fluorescence sensor according to a second embodiment of the present invention.

It is possible to call the blocks A1 to D3 shown in FIG. 2A and the blocks A'1 to D'3 shown in FIG. 11 a matrix. When determining the authenticity of the paper sheet, from which portion of the paper sheet the receiving unit 142 shall receive the light is determined based on the type of the paper sheet and the transport direction. Therefore, rules relating to which block of the matrix should be used can be previously decided based on the type of the paper sheet and the transport direction and can be stored in the paper sheet databases 17*a* and 27*a* stored in the storage unit 17. And, based on the type of the paper sheet and the transport direction determined at the time of performing the authentication, the block to be used may be retrieved from the paper sheet databases 17*a* and 27*a*, and the authentication may be performed by using the fluorescent light characteristic data of the retrieved block.

The various structural components mentioned in the first embodiment and the second embodiment are functional and are not necessarily present physically. That is, decentralization and/or unification of various components are not limited to that shown in the drawings. All of or some of the components may be decentralized and/or unified in desired units, functionally or physically, depending on various load, operating conditions, and the like.

INDUSTRIAL APPLICABILITY

As explained above, the paper sheet authentication apparatus according to the present invention is suitable in implementing high speed and simple authentication of the several types of the paper sheets to which a fluorescent/phosphorescent material having fluorescent light and/or phosphorescent light characteristic is applied.

EXPLANATION OF REFERENCE NUMERALS

10, 20 Paper sheet authentication apparatus
11 Hopper
12 Transport unit
13 Line sensor
14, 24 Fluorescence sensor
141 Amplifier board
142, 242 Receiving unit
142*a*, 242*a* First receiving unit
142*b*, 242*b* Second receiving unit
142*c*, 242*c* Third receiving unit
142*d*, 242*d* Fourth receiving unit
143, 243 Receiving side filter
143*a*, 243*a* First receiving side filter
143*b*, 243*b* Second receiving side filter
143*c*, 243*c* Third receiving side filter
144, 244 Light-source side filter
145, 245 Light source
145*a*, 245*a* First light source
145*b*, 245*b* Second light source
145*c*, 245*c* Third light source
145*d*, 245*d* Fourth light source
146 LED control board
147, 247 Fluorescence sensor control unit
15 Stacking unit
16 Reject unit
17 Storage unit
17*a*, 27*a* Paper sheet database
17*b*, 27*b* Fluorescence sensor acquired data
17*c*, 27*c* Data after time-axis adjustment
17*d*, 27*d* Data before level correction
17*e*, 27*e* Data after level correction

17*f*, 27*f* Data per band
17*g*, 27*g* Fluorescent light characteristic data
18 Controlling unit
18*a* Transport control unit
18*b* Paper sheet type recognition unit
18*c*, 28*c* Fluorescence sensor data acquisition unit
18*d*, 28*d* Fluorescent light characteristic data generating unit
18*e*, 28*e* Authentication unit
51 Feeding unit
51*a* Kicker roller
51*b* Feeding roller
51*c* Gate roller
52 Recognition and counting unit
53 Diverting unit
54 Display and operation unit
55 stacking-wheel type stacking mechanism
55*a* Stacking wheel
55*b* Blade
56 Shutter
61 Hopper remaining paper-sheet detecting sensor
62*a*, 62*b*, 62*c*, 62*d*, 62*e*, 62*f*, 64 Paper-sheet passage detecting sensor
63 Diversion timing sensor
65 Stacking-unit paper-sheet detecting sensor
66 reject-unit paper-sheet detecting sensor

The invention claimed is:

1. A paper sheet authentication apparatus that authenticates a paper sheet to which a fluorescent material is applied, comprising:

a type determination unit that determines a type of the paper sheet;

an excitation-light light source that emits a plurality of excitation lights, one by one, to the paper sheet, each excitation light having a different wavelength;

a plurality of filters each passes light of only a different wavelength band among light emitted by the fluorescent material excited by the excitation light;

a plurality of light receivers that receive the light passed by the plurality of filters;

a fluorescent light characteristic data generating unit that generates fluorescent light characteristic data based on an intensity of the light received by the plurality of light receivers when the excitation light is emitted by the excitation-light light source;

a storage unit that previously stores therein data of a genuine paper sheet; and an authentication unit that authenticates the paper sheet by using the of the genuine paper sheet corresponding to the type of the paper sheet determined by the type determination unit and the fluorescent light characteristic data generated by the fluorescent light characteristic data generating unit, wherein the plurality of filters include a first filter and a second filter, and the plurality of light receivers include a first receiver and a second receiver, and the first filter is overlapped on both the first receiver and the second receiver, and the second filter is overlapped on the second receiver.

2. The paper sheet authentication apparatus according to claim 1, wherein the excitation-light light source, the plurality of filters, and the plurality of light receivers are all arranged on one surface side of the paper sheet.

3. The paper sheet authentication apparatus according to claim 1, wherein the excitation-light light source is arranged on one surface side of the paper sheet, and the plurality of filters and the plurality of light receivers are arranged on the other surface side of the paper sheet.

4. The paper sheet authentication apparatus according to claim 1, wherein while the excitation-light light source emits one excitation light to the paper sheet, the intensity of the light that has been received by each of the plurality of light receivers is acquired sequentially or acquired at the same time.

5. The paper sheet authentication apparatus according to claim 4, wherein the excitation-light light source periodically and sequentially emits the plurality of excitation lights of different wavelengths, the plurality of light receivers periodically and sequentially receive light of one wavelength band at a time, and the fluorescent light characteristic data generating unit generates the fluorescent light characteristic data respectively based on the intensity of light received by each of the plurality of light receivers.

6. The paper sheet authentication apparatus according to claim 1, wherein the fluorescent light characteristic data generating unit generates a matrix of an excitation light wavelengths and light receiving wavelength bands, each excitation light wavelength corresponding to a wavelength of each excitation light and each light receiving wavelength band corresponding to a wavelength band of the light received by each light receiver, the fluorescent light characteristic data generating unit generates the fluorescent light characteristic for each domain of the matrix, the storage unit stores therein a domain of the matrix to be used by the authentication unit, per type of the paper sheet, and the authentication unit performs the authentication by using the fluorescent light characteristic data of the domain of the matrix corresponding to the type of the paper sheet determined by the type determination unit.

7. The paper sheet authentication apparatus according to claim 1, wherein the authentication unit determines that light of a corresponding wavelength band has been received when the intensity of the light received by the plurality of light receivers is a specified value or more, and determines that the light of the corresponding wavelength band has not been received when the intensity of the light received by the plurality of light receivers is less than the specified value.

8. The paper sheet authentication apparatus according to claim 1, further comprising an optical image acquisition unit that acquires an optical image of the paper sheet, wherein the type determination unit determines the type of the paper sheet by using image data of a predetermined area of the paper sheet acquired, by the optical image acquisition unit, while the paper sheet is being transported.

9. The paper sheet authentication apparatus according to claim 1, wherein the plurality of light receivers measure the intensity of the light emitted by the fluorescent material of the sheet being transported, and the fluorescent light characteristic data generating unit generates the fluorescent light characteristic data based on the intensity of the light measured by the plurality of light receivers at a predetermined area of the paper sheet.

10. The paper sheet authentication apparatus according to claim 1, wherein the plurality of light receivers receive the light passed by the plurality of filters while the excitation light is emitted by the excitation-light light source, and receive the light passed by the plurality of filters after the excitation-light light source is turned off as phosphorescent light, the fluorescent light characteristic data generating unit further generates phosphorescent light characteristic data based on the intensity of the phosphorescent light, the storage unit storing therein data on the phosphorescent light of the genuine paper sheet, and the authentication unit determines, based on the type of the paper sheet determined by the type determination unit, authenticity of the paper sheet by using at least one of the fluorescent light characteristic data and the phosphorescent light characteristic data generated by the fluorescent light characteristic data generating unit, and corresponding data of the genuine paper sheet.

11. The paper sheet authentication apparatus according to claim 1, wherein the excitation-light light source emits excitation lights having different wavelengths in a visible light band, and the plurality of filters each passes light having a different wavelength in an infrared light band.

12. The paper sheet authentication apparatus according to claim 1, wherein the excitation-light light source emits excitation lights having different wavelengths in an infrared light band, and the plurality of filters each passes pass light having a different wavelength in an infrared light band.

13. The paper sheet authentication apparatus according to claim 1, wherein the plurality of filters further includes a third filter, the plurality of light receivers further includes a third receiver and a fourth receiver, the first filter is overlapped on the first receiver, the second receiver and the third receiver, the second filter is overlapped on the second receiver and the third receiver and the third filter is overlapped on the third receiver.

14. The paper sheet authentication apparatus according to claim 1, wherein the fluorescent light characteristic data generating unit is configured to correct, based on physical positions of the plurality of light receivers and a transport speed of the paper sheet, a time difference in data acquired from the plurality of light receivers caused from the difference of physical positions of the plurality of the light receivers with respect to a transport direction of the paper sheet.

15. The paper sheet authentication apparatus according to claim 13, wherein the four light receivers are arranged in a two-by-two matrix.

* * * * *